United States Patent
Powell et al.

(10) Patent No.: US 8,945,243 B2
(45) Date of Patent: Feb. 3, 2015

(54) SYSTEMS CAPABLE OF ADDING CELLULOSIC BIOMASS TO A DIGESTION UNIT OPERATING AT HIGH PRESSURES AND ASSOCIATED METHODS FOR CELLULOSIC BIOMASS PROCESSING

(75) Inventors: Joseph Broun Powell, Houston, TX (US); Juben Nemchand Chheda, Houston, TX (US); Thomas Lamar Flowers, Katy, TX (US)

(73) Assignee: Shell Oil Company, Houston, TX (US)

(*) Notice: Subject to any disclaimer, the term of this patent is extended or adjusted under 35 U.S.C. 154(b) by 426 days.

(21) Appl. No.: 13/332,322

(22) Filed: Dec. 20, 2011

(65) Prior Publication Data

US 2013/0152457 A1 Jun. 20, 2013

Related U.S. Application Data

(60) Provisional application No. 61/576,664, filed on Dec. 16, 2011.

(51) Int. Cl.
*C10L 1/00* (2006.01)

(52) U.S. Cl.
USPC .......................... 44/307; 585/240

(58) Field of Classification Search
USPC ............................ 44/307; 585/240
See application file for complete search history.

(56) References Cited

U.S. PATENT DOCUMENTS 8,765,428 B2 * 7/2014 Herring et al. ................ 435/165

FOREIGN PATENT DOCUMENTS

| EP | 204354 | 12/1986 |
|---|---|---|
| WO | 2007130337 | 11/2007 |
| WO | WO2009055793 | 4/2009 |
| WO | WO2010078930 | 7/2010 |
| WO | WO2011057413 | 5/2011 |

* cited by examiner

*Primary Examiner* — Cephia D Toomer

(57) ABSTRACT

When processing cellulosic biomass, it may be desirable for a digestion unit to operate without being fully depressurized for process efficiency purposes. Methods for processing cellulosic biomass may comprise providing a biomass conversion system comprising a pressurization zone and a digestion unit that are operatively connected to one another; providing cellulosic biomass at a first pressure; introducing at least a portion of the cellulosic biomass into the pressurization zone and pressurizing the pressurization zone to a second pressure higher than the first pressure; after pressurizing the pressurization zone, transferring at least a portion of the cellulosic biomass from the pressurization zone to the digestion unit, which is at a third pressure that is less than or equal to the second pressure but higher than the first pressure; and digesting at least a portion of the cellulosic biomass in the digestion unit to produce a hydrolysate comprising soluble carbohydrates.

24 Claims, 6 Drawing Sheets

SYSTEMS CAPABLE OF ADDING CELLULOSIC BIOMASS TO A DIGESTION UNIT OPERATING AT HIGH PRESSURES AND ASSOCIATED METHODS FOR CELLULOSIC BIOMASS PROCESSING

The present application claims the benefit of U.S. Provisional Patent Application Ser. No. 61/576,664 filed Dec. 16, 2011, the entire disclosure of which is hereby incorporated by reference.

FIELD OF THE INVENTION

The present disclosure generally relates to the processing of cellulosic biomass, and, more specifically, to biomass conversion systems and methods that allow cellulosic biomass solids to be added to a digestion unit operating at elevated pressures of about 30 bar or more.

BACKGROUND

Significant attention has been placed on developing alternative energy sources to fossil fuels. One fossil fuel alternative having significant potential is biomass, particularly cellulosic biomass such as, for example, plant biomass. As used herein, the term "biomass" will refer to a living or recently living biological material. Complex organic molecules within biomass can be extracted and broken down into simpler organic molecules, which can subsequently be processed through known chemical transformations into industrial chemicals or fuel blends (i.e., a biofuel). In spite of biomass's potential in this regard, particularly plant biomass, an energy- and cost-efficient process that enables the conversion of biomass into such materials has yet to be realized.

Cellulosic biomass is the world's most abundant source of carbohydrates due to the lignocellulosic materials located within the cell walls of higher plants. Plant cell walls are divided into two sections: primary cell walls and secondary cell walls. The primary cell wall provides structural support for expanding cells and contains three major polysaccharides (cellulose, pectin, and hemicellulose) and one group of glycoproteins. The secondary cell wall, which is produced after the cell has finished growing, also contains polysaccharides and is strengthened through polymeric lignin covalently crosslinked to hemicellulose. Hemicellulose and pectin are typically found in abundance, but cellulose is the predominant polysaccharide and the most abundant source of carbohydrates. Collectively, these materials will be referred to herein as "cellulosic biomass."

Plants can store carbohydrates in forms such as, for example, sugars, starches, celluloses, lignocelluloses, and/or hemicelluloses. Any of these materials can represent a feedstock for conversion into industrial chemicals or fuel blends. Carbohydrates can include monosaccharides and/or polysaccharides. As used herein, the term "monosaccharide" refers to hydroxy aldehydes or hydroxy ketones that cannot be further hydrolyzed to simpler carbohydrates. Examples of monosaccharides can include, for example, dextrose, glucose, fructose, and galactose. As used herein, the term "polysaccharide" refers to saccharides comprising two or more monosaccharides linked together by a glycosidic bond. Examples of polysaccharides can include, for example, sucrose, maltose, cellobiose, and lactose. Carbohydrates are produced during photosynthesis, a process in which carbon dioxide is converted into organic compounds as a way to store energy. This energy can be released when the carbohydrates are oxidized to generate carbon dioxide and water.

Despite their promise, the development and implementation of bio-based fuel technology has been slow. A number of reasons exist for this slow development. Ideally, a biofuel would be compatible with existing engine technology and have capability of being distributed through existing transportation infrastructure. Current industrial processes for biofuel formation are limited to fermentation of sugars and starches to ethanol, which competes with these materials as a food source. In addition, ethanol has a low energy density when used as a fuel. Although some compounds that have potential to serve as fuels can be produced from biomass resources (e.g., ethanol, methanol, biodiesel, Fischer-Tropsch diesel, and gaseous fuels, such as hydrogen and methane), these fuels generally require new distribution infrastructure and/or engine technologies to accommodate their physical characteristics. As noted above, there has yet to be developed an industrially scalable process that can convert biomass into fuel blends in a cost- and energy-efficient manner that are similar to fossil fuels.

SUMMARY

The present disclosure generally relates to the processing of cellulosic biomass, and, more specifically, to biomass conversion systems and methods that allow cellulosic biomass solids to be added to a digestion unit operating at elevated pressures of about 30 bar or more.

In some embodiments, the present invention provides a method comprising: providing a biomass conversion system comprising a pressurization zone and a digestion unit that are operatively connected to one another; providing a cellulosic biomass at a first pressure; introducing at least a portion of the cellulosic biomass into the pressurization zone and then pressurizing the pressurization zone to a second pressure that is higher than the first pressure; after pressurizing the pressurization zone, transferring at least a portion of the cellulosic biomass from the pressurization zone to the digestion unit, which is at a third pressure that is less than or equal to the second pressure but higher than the first pressure; and digesting at least a portion of the cellulosic biomass in the digestion unit to produce a hydrolysate comprising soluble carbohydrates within a liquor phase.

In some embodiments, the present invention provides a method comprising: providing a biomass conversion system comprising a pressurization zone and a digestion unit that are operatively connected to one another; providing a cellulosic biomass; introducing at least a portion of the cellulosic biomass into the pressurization zone and then pressurizing the pressurization zone, at least in part, with a liquor phase comprising an organic solvent; after pressurizing the pressurization zone, transferring at least a portion of the cellulosic biomass from the pressurization zone to the digestion unit, wherein the digestion unit is at a pressure that is less than or equal to the pressure of the pressurization zone; and digesting at least about 90% of the cellulosic biomass, on a dry basis, to produce a hydrolysate comprising soluble carbohydrates within a liquor phase.

In some embodiments, the present invention provides a biomass conversion system comprising: a loading mechanism, a pressurization zone, and a digestion unit that are operatively connected to one another in sequential series; a fluid circulation loop establishing fluid communication between an inlet and an outlet of the digestion unit; and a fluid transport line establishing fluid communication between the fluid circulation loop and the pressurization zone; wherein the pressurization zone and the digestion unit are operatively connected to one another in a manner such that at least a portion of a cellulosic biomass in the pressurization zone can be transferred to the digestion unit while the digestion unit is operating at a pressure of at least about 30 bar.

The features and advantages of the present invention will be readily apparent to one having ordinary skill in the art upon a reading of the description of the preferred embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary in the art and the benefit of this disclosure.

DETAILED DESCRIPTION

Figure 1:
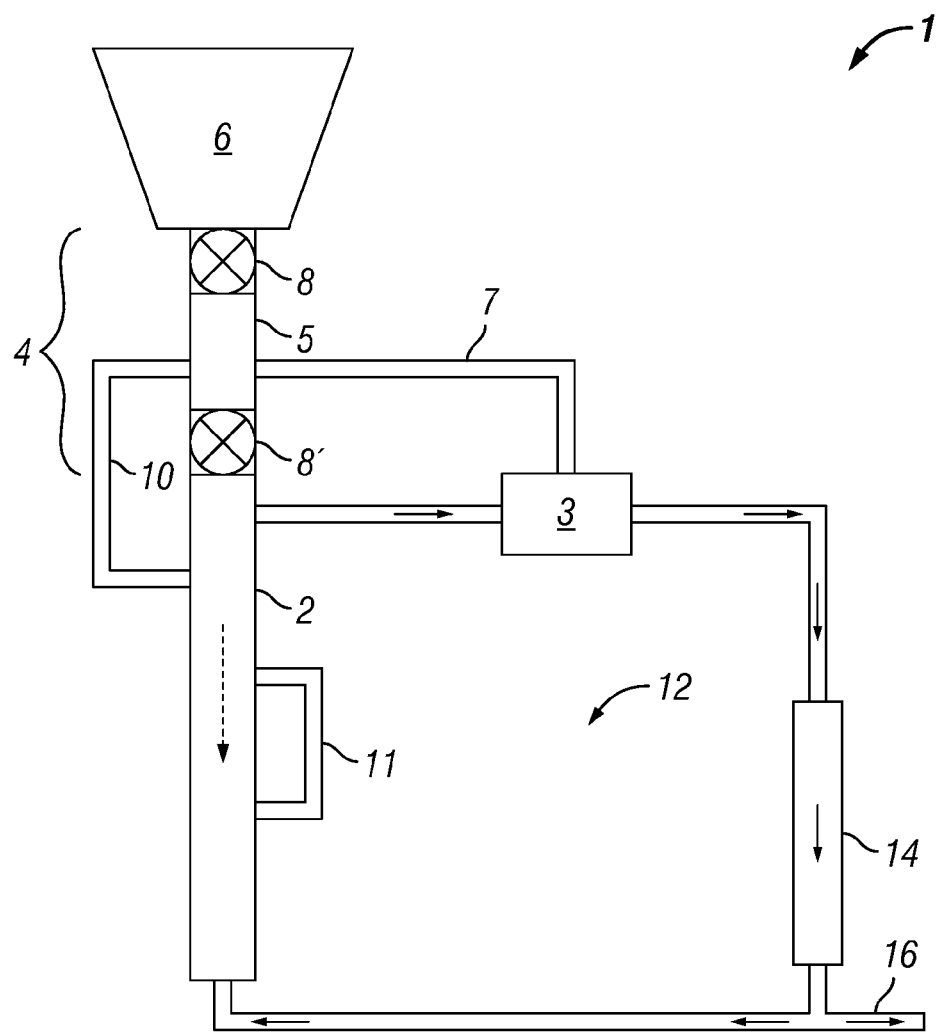
FIG. 1 shows a schematic of an illustrative embodiment of a biomass conversion system which allows a digestion unit therein to be semi-continuously loaded with biomass while operating at elevated pressures.

The present disclosure generally relates to the processing of cellulosic biomass, and, more specifically, to biomass conversion systems and methods that allow cellulosic biomass solids to be added to a digestion unit operating at elevated pressures of about 30 bar or more.

Unless otherwise specified herein, it is to be understood that use of the term "biomass" in the description that follows refers to "cellulosic biomass solids." Solids may be in any size, shape, or form. The cellulosic biomass solids may be natively present in any of these solid sizes, shapes, or forms or may be further processed prior to digestion in the embodiments described herein. The cellulosic biomass solids may be present in a slurry form in the embodiments described herein.

In practicing the present embodiments, any type of suitable biomass source may be used. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, and any combination thereof. Leaves, roots, seeds, stalks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

When converting biomass into industrial chemicals and fuel blends, the complex organic molecules therein need to be broken down into simpler molecules, which may be transformed into other compounds. For cellulosic biomass, the first step in this process is the production of soluble carbohydrates, typically by digestion. Digestion of cellulosic biomass may be conducted using an acid or base in a kraft-like process at low temperatures and pressures to produce a biomass pulp. These types of digestion processes are commonly used in the paper and pulpwood industry. According to the embodiments described herein, the digestion rate of cellulosic biomass may be accelerated in the presence of a digestion solvent at elevated temperatures and pressures that maintain the digestion solvent in a liquid state above its normal boiling point. In various embodiments, the digestion solvent may contain an organic solvent, particularly an in situ-generated organic solvent, which may provide particular advantages, as described hereinafter.

When a digestion solvent is used at high temperatures and pressures, the digestion process may become fairly energy intensive. If the energy input requirements for the digestion process become too great, the economic feasibility of cellulosic biomass as a feedstock material may be jeopardized. That is, if the energy input needed to digest cellulosic biomass is too great, processing costs may become higher than the actual value of the product being generated. In order to keep processing costs low, the amount of externally added heat input to the digestion process should be kept as low as possible while achieving as high as possible conversion of the cellulosic biomass into soluble carbohydrates.

A particular problem with the foregoing high temperature/high pressure digestion approach is that it may be difficult to add cellulosic biomass to a digestion unit operating at an elevated pressure. One reason for this difficulty is that cellulosic biomass, particularly wood, may be fairly rigid and problematic to compress into a pressure-sealing plug during transfer. Biomass addition to the pressurized digestion unit is needed in order to keep the digestion unit continually operating. If the digestion unit has to be at least partially depressurized and cooled to add more biomass, costly process downtime may result. Furthermore, when the digestion unit has to be cooled and at least partially depressurized, bringing the digestion unit back to its normal operating temperature and pressure may considerably add to the energy input requirements of the process. This energy input inefficiency may jeopardize the viability of biomass as a feedstock material.

The present disclosure provides systems and methods that allow cellulosic biomass to be efficiently digested to form soluble carbohydrates, which may subsequently be converted through one or more catalytic reduction reactions (e.g., hydrogenolysis and/or hydrogenation) into reaction products comprising oxygenated intermediates that may be further processed into higher hydrocarbons. The higher hydrocarbons may be useful in forming industrial chemicals and transportation fuels (i.e., a biofuel), including, for example, synthetic gasoline, diesel fuels, jet fuels, and the like. As used herein, the term "biofuel" will refer to any transportation fuel formed from a biological source.

As used herein, the term "soluble carbohydrates" refers to monosaccharides or polysaccharides that become solubilized in a digestion process. As used herein, the term "oxygenated intermediates" refers to alcohols, polyols, ketones, aldehydes, and mixtures thereof that are produced from a catalytic reduction reaction (e.g., hydrogenolysis and/or hydrogenation) of soluble carbohydrates. As used herein, the term "higher hydrocarbons" refers to hydrocarbons having an oxygen to carbon ratio less than that of at least one component of the biomass source from which they are produced. As used herein, the term "hydrocarbon" refers to an organic compound comprising primarily hydrogen and carbon, although heteroatoms such as oxygen, nitrogen, sulfur, and/or phosphorus may be present in some embodiments. Thus, the term "hydrocarbon" also encompasses heteroatom-substituted compounds containing carbon, hydrogen, and oxygen, for example.

Illustrative carbohydrates that may be present in cellulosic biomass may include, for example, sugars, sugar alcohols, celluloses, lignocelluloses, hemicelluloses, and any combination thereof. Once soluble carbohydrates have been removed from the biomass matrix through a digestion process according to the embodiments described herein, the soluble carbohydrates may be transformed into a reaction product comprising oxygenated intermediates via a catalytic reduction reaction. Until the soluble carbohydrates are transformed by the catalytic reduction reaction, they are very reactive and may be subject to degradation under the digestion conditions. For example, soluble carbohydrates may degrade into insoluble byproducts such as, for example, caramelans and other heavy ends degradation products that are not readily transformable by further reactions into a biofuel. Such degradation products may also be harmful to equipment used in the biomass processing. Thus, in some embodiments, the soluble carbohydrates and a digestion solvent are circulated in a fluid circulation loop to remove them from the digestion conditions and convert them into less reactive oxygenated intermediates via a catalytic reduction reaction.

In some embodiments, the oxygenated intermediates may be further transformed into a biofuel using any combination of further hydrogenolysis reactions, hydrogenation reactions, condensation reactions, isomerization reactions, oligomerization reactions, hydrotreating reactions, alkylation reactions, and the like. In some embodiments, at least a portion of the oxygenated intermediates may be recirculated to the digestion unit to comprise at least a portion of the digestion solvent. Recirculation of at least a portion of the oxygenated intermediates to the digestion unit may also be particularly advantageous in terms of heat integration and process efficiency.

As previously noted, a significant issue for processing cellulosic biomass is the development of a mechanism and process by which a pressurized digestion unit may be continuously or semi-continuously supplied with fresh biomass. Without the ability to introduce fresh biomass to a pressurized digestion unit, depressurization and cooling of the digestion unit may take place during the addition of fresh biomass, significantly reducing the energy- and cost-efficiency of the conversion process. As used herein, the term "continuous addition" and grammatical equivalents thereof will refer to a process in which biomass is added to a digestion unit in an uninterrupted manner without fully depressurizing the digestion unit. As used herein, the term "semi-continuous addition" and grammatical equivalents thereof will refer to a discontinuous, but as-needed, addition of biomass to a digestion unit without fully depressurizing the digestion unit. The ability to continuously or semi-continuously feed a pressurized digestion unit can be advantageous in terms of time and cost savings. In addition, fresh biomass introduction may take place more frequently than would otherwise be possible.

Developing a mechanism and process by which biomass solids may be loaded to a pressurized digestion unit is not a simple matter. As discovered by the present inventors, it may be desirable to soak or infiltrate the biomass solids with a digestion solvent, particularly a digestion solvent containing an organic solvent, before introducing the biomass to the digestion unit. In some cases, soaking the biomass with a digestion solvent may make it easier to pressurize the biomass when introducing it to the digestion unit. In some cases, soaking the biomass with a digestion solvent may decrease the propensity of the biomass to float in the digestion unit. Floating biomass in the digestion unit may result in inefficient digestion and make it difficult to introduce further biomass into the digestion unit. In addition, floating biomass may make it difficult to achieve pressure isolation of the digestion unit. For example, floating biomass may make it difficult to close a valve providing pressure isolation to the digestion unit. As hereafter described, the present embodiments may overcome many of these obstacles encountered in the loading of biomass to a pressurized digestion unit. Advantages of particular embodiments will be discussed in further detail hereinbelow, with reference to the drawings.

A leading advantage of the biomass conversion systems described herein is that the systems are designed to favor a high conversion of biomass into soluble carbohydrates, which may be subsequently processed into a biofuel. The biomass conversion systems and associated methods described herein are to be distinguished from those of the paper and pulpwood industry, where the goal is to harvest partially digested wood pulp, rather than obtaining as high as possible a quantity of soluble carbohydrates. In some embodiments, at least about 60% of the cellulosic biomass, on a dry basis, may be digested to a hydrolysate comprising soluble carbohydrates. In other embodiments, at least about 90% of the cellulosic biomass, on a dry basis, may be digested to a hydrolysate comprising soluble carbohydrates. The design of the present systems may enable such high conversion rates by minimizing the formation of degradation products during the processing of biomass.

In some embodiments, biomass conversion systems described herein may enable the digestion unit to operate continuously at elevated pressures. For example, in some embodiments, the digestion unit may be operated at a pressure of at least about 30 bar while biomass is being added thereto. In some embodiments, a biomass conversion system may comprise a loading mechanism, a pressurization zone, and a digestion unit that are operatively connected to one another in sequential series; a fluid circulation loop establishing fluid communication between an inlet and an outlet of the digestion unit; and a fluid transport line establishing fluid communication between the fluid circulation loop and the pressurization zone; wherein the pressurization zone and the digestion unit are operatively connected to one another in a manner such that at least a portion of a cellulosic biomass in the pressurization zone can be transferred to the digestion unit while the digestion unit is operating at a pressure of at least about 30 bar.

In some embodiments, methods described herein can comprise: providing a biomass conversion system comprising a pressurization zone and a digestion unit that are operatively connected to one another; providing a cellulosic biomass at a first pressure; introducing at least a portion of the cellulosic biomass into the pressurization zone and then pressurizing the pressurization zone to a second pressure that is higher than the first pressure; after pressurizing the pressurization zone, transferring at least a portion of the cellulosic biomass from the pressurization zone to the digestion unit, which is at a third pressure that is less than or equal to the second pressure but higher than the first pressure; and digesting at least a portion of the cellulosic biomass in the digestion unit to produce a hydrolysate comprising soluble carbohydrates within a liquor phase.

In some embodiments, methods described herein can comprise: providing a biomass conversion system comprising a pressurization zone and a digestion unit that are operatively connected to one another; providing a cellulosic biomass; introducing at least a portion of the cellulosic biomass into the pressurization zone and then pressurizing the pressurization zone, at least in part, with a liquor phase comprising an organic solvent; after pressurizing the pressurization zone, transferring at least a portion of the cellulosic biomass from the pressurization zone to the digestion unit, wherein the digestion unit is at a pressure that is less than or equal to the pressure of the pressurization zone; and digesting at least about 90% of the cellulosic biomass, on a dry basis, to produce a hydrolysate comprising soluble carbohydrates within a liquor phase.

In some embodiments, the biomass conversion systems may further comprise a loading mechanism that is operatively connected to the pressurization zone. Any type of loading mechanism capable of dropping or transporting cellulosic biomass may be used in the present embodiments. Suitable loading mechanisms may include, for example, conveyer belts, vibrational tube conveyers, screw feeders, bin dispensers, and the like. It is to be recognized that in some embodiments, the loading mechanism may be omitted. For example, in some embodiments, addition of cellulosic biomass to the pressurization zone may take place manually. In some embodiments, the cellulosic biomass may be provided and introduced to the pressurization zone at the same time. That is, a loading mechanism need not necessarily be used.

In some embodiments, the digestion unit may be, for example, a pressure vessel of carbon steel, stainless steel, or a similar alloy. In some embodiments, a single digestion unit may be used. In other embodiments, multiple digestion units operating in series, parallel or any combination thereof may be used. In some embodiments, digestion may be conducted in a pressurized digestion unit operating continuously. However, in other embodiments, digestion may be conducted in batch mode. Suitable digestion units may include, for example, the "PANDIA Digester" (Voest-Alpine Industrienlagenbau GmbH, Linz, Austria), the "DEFIBRATOR Digester" (Sunds Defibrator AB Corporation, Stockholm, Sweden), the M&D (Messing & Durkee) digester (Bauer Brothers Company, Springfield, Ohio, USA) and the KAMYR Digester (Andritz Inc., Glens Falls, N.Y., USA). In some embodiments, the biomass may be at least partially immersed in the digestion unit. In other embodiments, the digestion unit may be operated as a trickle bed or pile-type digestion unit. Fluidized bed and stirred contact digestion units may also be used in some embodiments. Suitable digestion unit designs may include, for example, co-current, countercurrent, stirred tank, or fluidized bed digestion units.

In general, digestion may be conducted in a liquor phase. In some embodiments, the liquor phase may comprise a digestion solvent that comprises water. In some embodiments, the liquor phase may further comprise an organic solvent. In some embodiments, the organic solvent may comprise oxygenated intermediates produced from a catalytic reduction reaction of soluble carbohydrates. For example, in some embodiments, a digestion solvent may comprise oxygenated intermediates produced by a hydrogenolysis reaction of soluble carbohydrates. In some embodiments, bio-ethanol may be added to water as a startup digestion solvent, with a solvent comprising oxygenated intermediates being produced thereafter. Any other organic solvent that is miscible with water may also be used as a startup digestion solvent, if desired. In general, a sufficient amount of liquor phase is present in the digestion process such that the biomass surface remains wetted. The amount of liquor phase may be further chosen to maintain a sufficiently high concentration of soluble carbohydrates to attain a desirably high reaction rate during subsequent catalytic reduction, but not so high such that degradation becomes problematic. In some embodiments, the concentration of soluble carbohydrates may be kept below about 5% by weight of the liquor phase to minimize degradation. However, it is to be recognized that higher concentrations may be used in some embodiments. In some embodiments, organic acids such as, for example, acetic acid, oxalic acid, acetylsalicylic acid, and acetylsalicylic acid may be included in the liquor phase as an acid promoter of the digestion process.

In some embodiments, prior to digestion, the cellulosic biomass may be washed and/or reduced in size (e.g., by chopping, crushing, debarking, and the like) to achieve a desired size and quality for being digested. The operations may remove substances that interfere with further chemical transformation of soluble carbohydrates and/or improve the penetration of digestion solvent into the biomass. In some embodiments, washing may occur within the digestion unit prior to pressurization. In other embodiments, washing may occur before the biomass is placed in the digestion unit.

In some embodiments, the digestion solvent may comprise oxygenated intermediates of an in situ generated organic solvent. As used herein, the term "in situ generated organic solvent" refers to the reaction product produced from a catalytic reduction reaction of soluble carbohydrates, where the catalytic reduction reaction takes place in a catalytic reduction reactor unit coupled to the biomass conversion system. In some embodiments, the in situ generated organic solvent may comprise at least one alcohol, ketone, or polyol. In alternative embodiments, the digestion solvent may be at least partially supplied from an external source. For example, in an embodiment, bio-ethanol may be used to supplement the in situ-generated organic solvent. In some embodiments, the digestion solvent may be separated, stored, or selectively injected into the digestion unit so as to maintain a desired concentration of soluble carbohydrates.

In some embodiments, digestion may take place over a period of time at elevated temperatures and pressures. In some embodiments, digestion may take place at a temperature ranging between about 100° C. to about 240° C. for a period of time. In some embodiments, the period of time may range between about 0.25 hours and about 24 hours. In some embodiments, the digestion to produce soluble carbohydrates may occur at a pressure ranging between about 1 bar (absolute) and about 100 bar.

In various embodiments, suitable biomass digestion techniques may include, for example, acid digestion, alkaline digestion, enzymatic digestion, and digestion using hot-compressed water.

Various factors may influence the digestion process. In some embodiments, hemicellulose may be extracted from the biomass at temperatures below about 160° C. to produce a predominantly $C_5$ carbohydrate fraction. At increasing temperatures, this $C_5$ carbohydrate fraction may be thermally degraded. It may therefore be advantageous to convert the $C_5$ and/or $C_6$ carbohydrates and/or other sugar intermediates into more stable intermediates such as sugar alcohols, alcohols, and polyols. By reacting the soluble carbohydrates in a catalytic reduction reactor unit and recycling at least a portion of the reaction product to the digestion unit, the concentration of oxygenated intermediates may be increased to commercially viable concentrations while the concentration of soluble carbohydrates is kept low.

In some embodiments, cellulose digestion may begin above about 160° C., with solubilization becoming complete at temperatures around about 190° C., aided by organic acids (e.g., carboxylic acids) formed from partial degradation of carbohydrate components. Some lignins may be solubilized before cellulose, while other lignins may persist to higher temperatures. These lignins may optionally be removed at a later time. The digestion temperature may be chosen so that carbohydrates are solubilized while limiting the formation of degradation products.

In some embodiments, a plurality of digestion units may be used. In such embodiments, the biomass may first be introduced into a digestion unit operating at about 160° C. or below to solubilize $C_5$ carbohydrates and some lignin without substantially degrading these products. The remaining biomass may then exit the first digestion unit and pass to a second digestion unit. The second digestion unit may be used to solubilize $C_6$ carbohydrates at a higher temperature. In another embodiment, a series of digestion units may be used with an increasing temperature profile so that a desired carbohydrate fraction is solubilized in each.

In some embodiments, the cellulosic biomass within the pressurization zone may be pressurized, at least in part, by introducing at least a portion of the liquor phase to the pressurization zone. In some embodiments, the cellulosic biomass within the pressurization zone may be pressurized, at least in part, by introducing a gas to the pressurization zone. In some embodiments, the pressurization zone may be pressurized by adding at least a portion of the liquor phase, followed by a gas, to the pressurization zone. In some embodiments, the liquor phase may comprise an organic solvent, such as an in situ-generated organic solvent. In some embodiments, the in situ-generated solvent may be transferred from the digestion unit to the pressurization zone. In some or other embodiments, the in situ-generated organic solvent may be transferred from a surge vessel within a fluid circulation line in fluid communication with an outlet of the digestion unit.

Some embodiments of the present disclosure will now be described with reference to the drawings. In some embodiments, the biomass conversion systems depicted in the drawings may allow biomass solids to be continuously or semi-continuously loaded to a pressurized digestion unit therein, thereby allowing biomass processing to take place in a substantially uninterrupted manner. Batch processing may also be used, however. In some embodiments, the biomass conversion systems are capable of such continuous or semi-continuous addition while the digestion unit is operating at a pressure of about 30 bar or greater, more typically at a pressure of about 70 bar or greater. In some embodiments, after transferring the biomass to the digestion unit, the digestion unit may be at a pressure of about 30 bar or greater.

FIG. 1 shows a schematic of an illustrative embodiment of a biomass conversion system which allows a digestion unit therein to be semi-continuously loaded with biomass while operating at elevated pressures. As shown in FIG. 1, biomass conversion system 1 contains digestion unit 2, which is operatively connected to pressurization zone 4 and loading vessel 6 in sequential series. Pressurization zone 4 contains pressure vessel 5. Valves 8 and 8' allow pressure vessel 5 and digestion unit 2 to be isolated from one another and pressurized. In some embodiments, pressurization of pressure vessel 5 may take place using a liquor phase transferred from digestion unit 2, which is supplied by line 10. In some or other embodiments, pressurization of pressure vessel 5 may take place using a liquor phase transferred from optional surge vessel 3 via line 7. The liquor phase may contain digestion solvent, soluble carbohydrates, and/or a reaction product produced from soluble carbohydrates. Use of lines 7 and 10 is optional, and other means may also be used to pressurize pressure vessel 5 including, for example, an external liquid or gas. However, it is to be noted that use of a liquor phase from digestion unit 2 to affect pressurization may be advantageous, since it lessens the need to heat the biomass after addition and results in less temperature variation when subsequently transferred to the digestion unit. Optional fluid circulation loop 11 may also be present to transfer liquor phase from one portion of the digestion unit to another. Fluid circulation loop 11 may also be used, as needed, to obtain a desired temperature profile in the digestion unit in order for optimal digestion rates to be realized.

Biomass conversion system 1 also includes fluid circulation loop 12, which may circulate a hydrolysate produced in digestion unit 2 to catalytic reduction reactor unit 14. The direction of fluid flow within fluid circulation loop 12 is indicated by arrows. Catalytic reduction reactor unit 14 may transform soluble carbohydrates in the hydrolysate into a reaction product comprising oxygenated intermediates. For example, in an embodiment, the hydrolysate may be at least partially transformed into oxygenated intermediates via contact with hydrogen in a catalytic hydrogenolysis reaction, for example. The reaction product may subsequently be recirculated to digestion unit 2 via fluid circulation loop 12 and/or removed by takeoff line 16 for further processing into a biofuel. For example, subsequent processing steps may include further catalytic reduction reactions (e.g., hydrogenolysis reactions, hydrogenation reactions, hydrotreating reactions such as hydrodesulfurization and hydrodenitrification, and the like), condensation reactions, isomerization reactions, dehydration reactions, oligomerization reactions, alkylation reactions, and the like to remove at least a portion of the oxygenated functionalities and, optionally, other functionalities from the reaction product in order to prepare a biofuel having desired properties.

In the embodiment depicted in FIG. 1, fluid circulation loop 12 and digestion unit 2 are configured such that countercurrent flow is established within the digestion unit. Although it may be advantageous to establish countercurrent flow within digestion unit 2, there is no requirement to do so. For example, co-current flow may be established by connecting fluid circulation loop 12 nearer the top of digestion unit 2. Circulation of a liquor phase within fluid circulation loop 12 may be desirable, since the high reactivity of soluble carbohydrates to produce undesired heavy ends byproducts may be reduced via catalytic reduction in catalytic reduction reactor unit 14. From a heat management standpoint, it may also be desirable to recirculate the reaction product within fluid circulation loop 12 to digestion unit 2. For example, the digestion process is endothermic such that heat needs to be added, whereas the catalytic reduction reaction taking place in catalytic reduction reactor unit 14 is exothermic. The liquor phase within fluid circulation loop 12 may return this heat, which would otherwise be wasted, to digestion unit 2, thereby lessening the need to supply heat from outside sources. This may improve the overall energy efficiency of the biomass conversion process and make the process more economically viable for formation of a biofuel.

In the operation of the biomass conversion system of FIG. 1, biomass may be introduced into pressurization vessel 5. Thereafter, pressurization vessel 5 may be pressurized to a pressure greater than or equal to that of digestion unit 2. In some embodiments, pressurization vessel 2 may be at least partially pressurized with liquor phase from digestion unit 2 and/or surge vessel 3. Once there is a need to introduce additional biomass to digestion unit 2, valve 8' may be opened, and the pressure differential may drive the biomass into digestion unit 2 without a pressure drop being experienced in the digestion unit. This may allow the digestion unit to continue its operation uninterrupted. Thereafter, valve 8' may again be closed to maintain digestion unit 2 in pressure isolation, and pressure vessel 5 may be at least partially depressurized and then reloaded.

Figure 2:
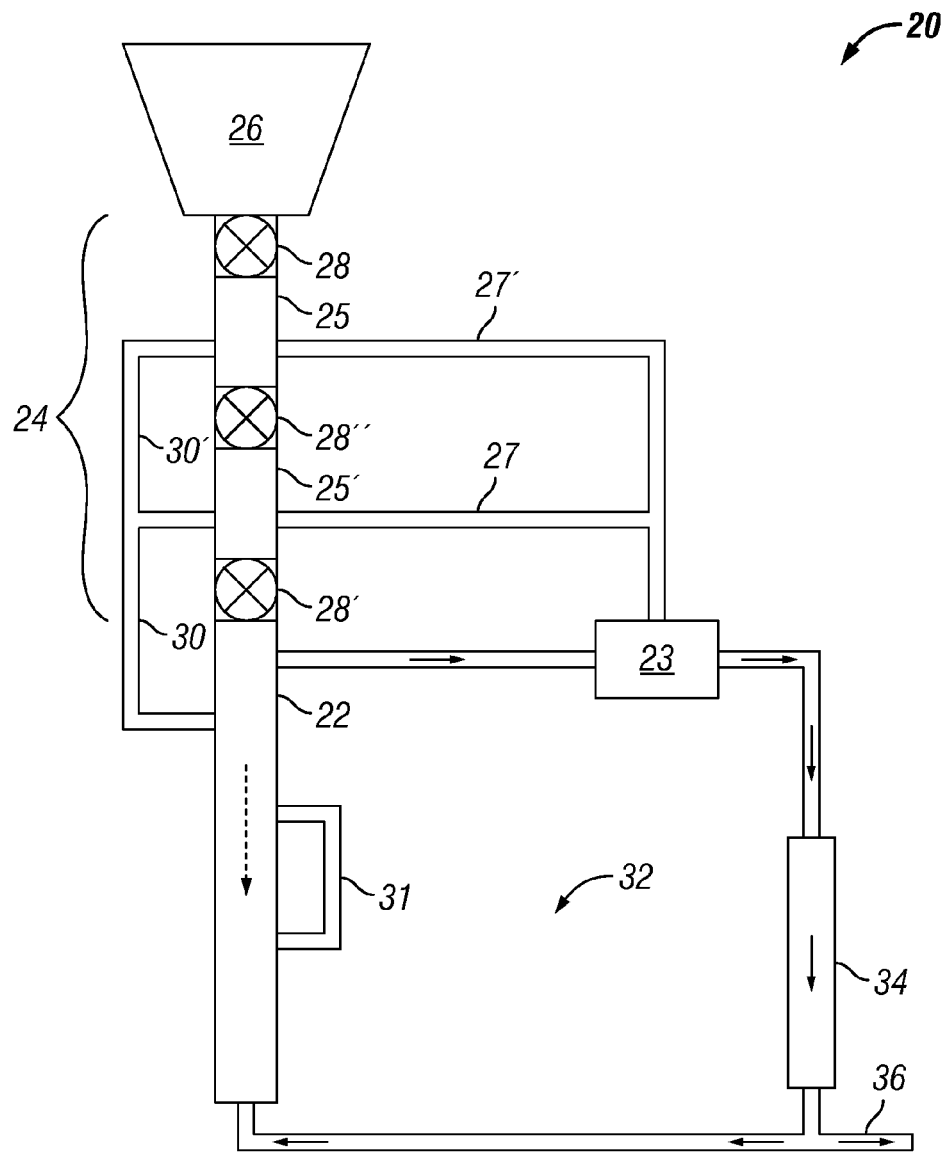
FIG. 2 shows a schematic of another illustrative embodiment of a biomass conversion system which allows a digestion unit therein to be semi-continuously loaded with biomass while operating at elevated pressures.

FIG. 2 shows a schematic of another illustrative embodiment of a biomass conversion system which allows a digestion unit therein to be semi-continuously loaded with biomass while operating at elevated pressures. Biomass conversion system 20 depicted in FIG. 2 contains digestion unit 22, loading vessel 26, fluid circulation loop 32, catalytic reduction reactor unit 34, takeoff line 36 and optional line 31, which operate similarly to like elements described in reference to FIG. 1. Whereas pressurization zone 4 of FIG. 1 contains one pressure vessel 5, pressurization zone 24 of FIG. 2 contains pressure vessels 25 and 25', which are separated by valve 28". Valves 28 and 28' perform similar functions as in the embodiment of FIG. 1. In some embodiments, lines 30 and 30' may be used to supply a liquor phase from digestion unit 22 to either of pressure vessels 25 or 25'. Likewise, in some embodiments, lines 27 and 27' may be used to supply a liquor phase from optional surge vessel 23 to either of pressure vessels 25 or 25'. Optionally, pressurization may take place with an externally added gas or liquid as well. The externally added gas or liquid may be separate from or in addition to the liquor phase introduced from digestion unit 22 or surge vessel 23.

The biomass conversion system depicted in FIG. 2 may be operated similarly to that described for FIG. 1, with the exception of how biomass is introduced into the pressurization zone and the pressurization zone is pressurized. In one embodiment, pressurization zone 24 may be pressurized in stages, for example, by stepping up the pressure at each pressurization vessel. In one embodiment, biomass may be placed in pressure vessel 25, which may then be pressurized to a first pressure. In an alternative embodiment, multiple pressure zones may be present in a single pressure vessel. Thereafter, the biomass may be transferred via pressure-assisted transfer to pressure vessel 25', which may then be pressurized to a second pressure that is greater than or equal to that at which digestion unit 22 is operating. In an embodiment, the pressure in pressure vessel 25 may be less than that in pressure vessel 25', such that the pressure is "stepped up" after each transfer. Facilitating the introduction of biomass solids to a digestion unit with this type of pressure step up may be advantageous where it is difficult or unnecessary to pressurize the entire pressurization zone. In another embodiment, the pressure in pressure vessels 25 and 25' may be substantially equal, and pressure vessel 25 may simply be a biomass holding area ready for transfer to pressure vessel 25'. That is, it is not necessary that a pressure increase occur in pressure vessel 25'. Once the biomass has been transferred from pressure vessel 25, it may be at least partially depressurized and biomass loading continued anew. It is to be recognized that although FIG. 2 has depicted only two pressure vessels, any number may be used in accordance with the foregoing embodiments.

In another embodiment, both pressure vessels 25 and 25' may contain biomass and be pressurized at a pressure greater than or equal to that in digestion unit 22. In this embodiment, at least a portion of the biomass in pressure vessel 25', may be transferred to digestion unit 22, as described above, while the biomass in pressure vessel 25 remains available to be subsequently transferred to pressure vessel 25' and then on to digestion unit 22. Once pressure vessel 25 has been emptied of biomass, it may be at least partially depressurized and refilled with fresh biomass.

In some embodiments, the pressurization zone may be configured such that the biomass may be continuously added to the pressurized digestion unit. Several biomass conversion systems that are capable of continuous biomass addition to a pressurized digestion unit are discussed in further detail below.

Figure 3:
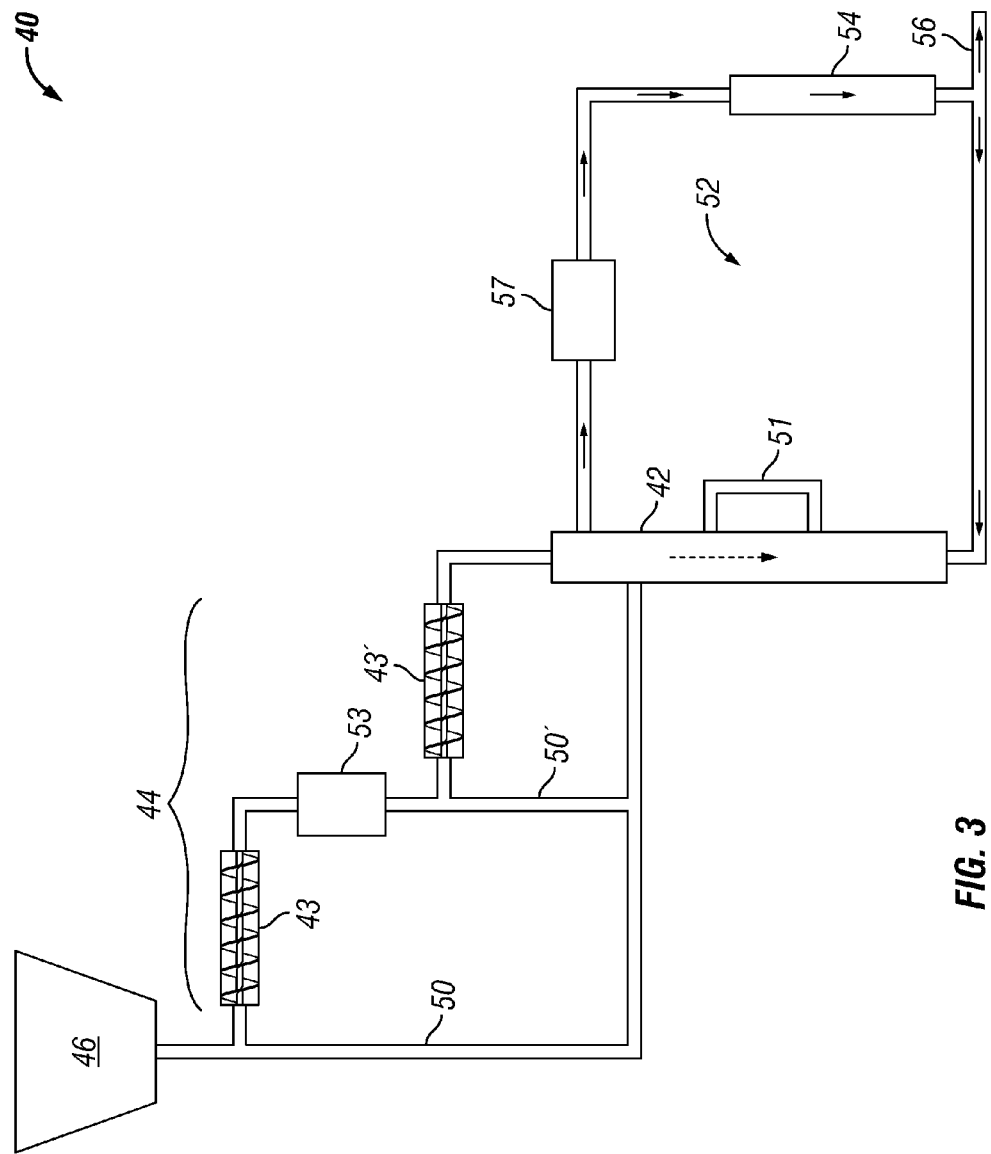
FIG. 3 shows a schematic of an illustrative embodiment of a biomass conversion system which allows a digestion unit therein to be continuously loaded with biomass while operating at elevated pressures.

FIG. 3 shows a schematic of an illustrative embodiment of a biomass conversion system which allows a digestion unit therein to be continuously loaded with biomass while operating at elevated pressures. Like the biomass conversion system depicted in FIG. 1, biomass conversion system 40 contains digestion unit 42, loading vessel 46, fluid circulation loop 52, catalytic reduction reactor unit 54, takeoff line 56, and optional line 51. As depicted in FIG. 3, pressurization zone 44 contains plug-forming feeders 43 and 43' connected in series with optional holding vessel 53 disposed therebetween. Lines 50 and 50' may be used to supply a liquor phase from digestion unit 42 to plug-forming feeders 43 or 43', respectively. Lines from surge vessel 57 may also supply a liquor phase to plug-forming feeders 43 and 43', although these lines have not been shown for purposes of clarity in FIG. 3. In general, any type of plug-forming mechanical feed system may be used. As depicted in FIG. 3, plug-forming feeders 43 and 43' are screw feeders. In alternative embodiments, a piston-driven feeder may be used for either or both of plug-forming feeders.

In the operation of biomass conversion system 40, biomass within loading vessel 46 may be supplied to plug-forming feeder 43, which may at least partially step up the pressure of the biomass. For example, plug-forming feeder 43 may establish a fluid plug comprising the biomass that increases the system pressure. The biomass may then be transferred to holding vessel 53, which may maintain the biomass in an elevated pressure state before it is transferred to plug-forming feeder 43' and subsequently introduced to digestion unit 42. In one embodiment, plug-forming feeder 43 may establish a pressure greater than or equal to the pressure in digestion unit 42, and plug-forming feeder 43' may maintain or increase that pressure. In another embodiment, plug-forming feeder 43 may establish a pressure below that of digestion unit 42, and plug-forming feeder 43' may further step up the pressure such that it is greater than or equal to that of digestion unit 42. As noted above, the use of plug-forming feeders 43 and 43' may allow biomass to be introduced to digestion unit 42 in a substantially continuous manner. Discontinuous biomass addition may be used as well, if desired. Although FIG. 3 has depicted only two plug-forming feeders operating in series, it is to be recognized that any number may be used. Likewise, the number of holding vessels may be greater than one as well.

Figure 4:
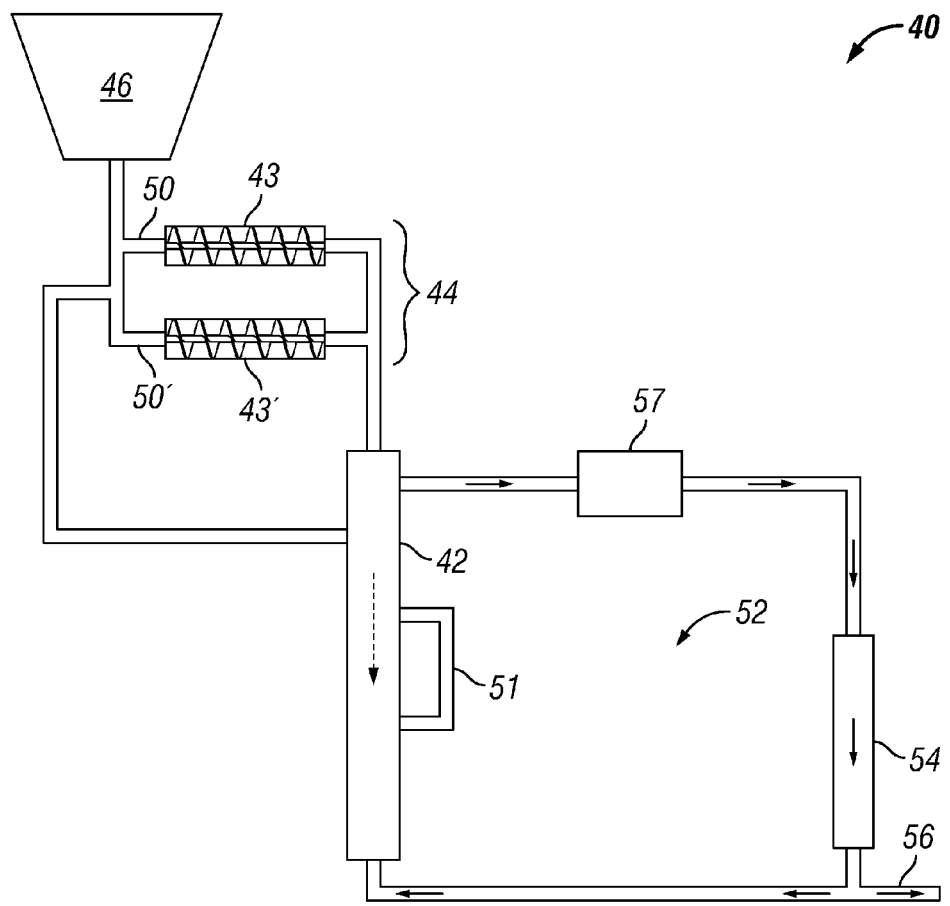
FIG. 4 shows a schematic of another illustrative embodiment of a biomass conversion system which allows a digestion unit therein to be continuously loaded with biomass while operating at elevated pressures.

Instead of arranging the plug-forming feeders in series, as depicted in FIG. 3, the plug-forming feeders, in other embodiments, may be arranged in parallel to one another and operated in a reciprocating manner. FIG. 4 shows a schematic of another illustrative embodiment of a biomass conversion system which allows a digestion unit therein to be continuously loaded with biomass while operating at elevated pressures. Discontinuous biomass addition may be used as well, if desired. The biomass conversion system depicted in FIG. 4 is similar to that depicted in FIG. 3, except plug-forming feeders 43 and 43' are arranged in parallel in FIG. 4 and holding vessel 53 has been omitted. Other elements in FIG. 4 are identical to those described for FIG. 3 and accordingly will not be described further.

The configuration displayed in FIG. 4 may be particularly advantageous if the biomass is not capable of being compressed into a mechanical plug seal to feed to a higher pressure. In the embodiment shown in FIG. 4, one feeder may be loaded at a lower pressure, while the parallel feeder may be pre-pressurized to the required delivery pressure after loading. In operating the biomass conversion system of FIG. 4, biomass may be supplied to a first screw feeder, pressurized, and transferred to the digestion unit. While the biomass in the first screw feeder is being transferred to the digestion unit, the second screw feeder may be loaded with biomass and pressurized, such that when the first screw feeder is empty, the biomass introduction may continue from the second screw feeder. The empty screw feeder may then be at least partially depressurized, refilled with biomass, and re-pressurized to continue the addition process anew. Although FIG. 4 has depicted only two screw feeders operating in parallel, it is to be recognized that any number may be used.

Figure 5:
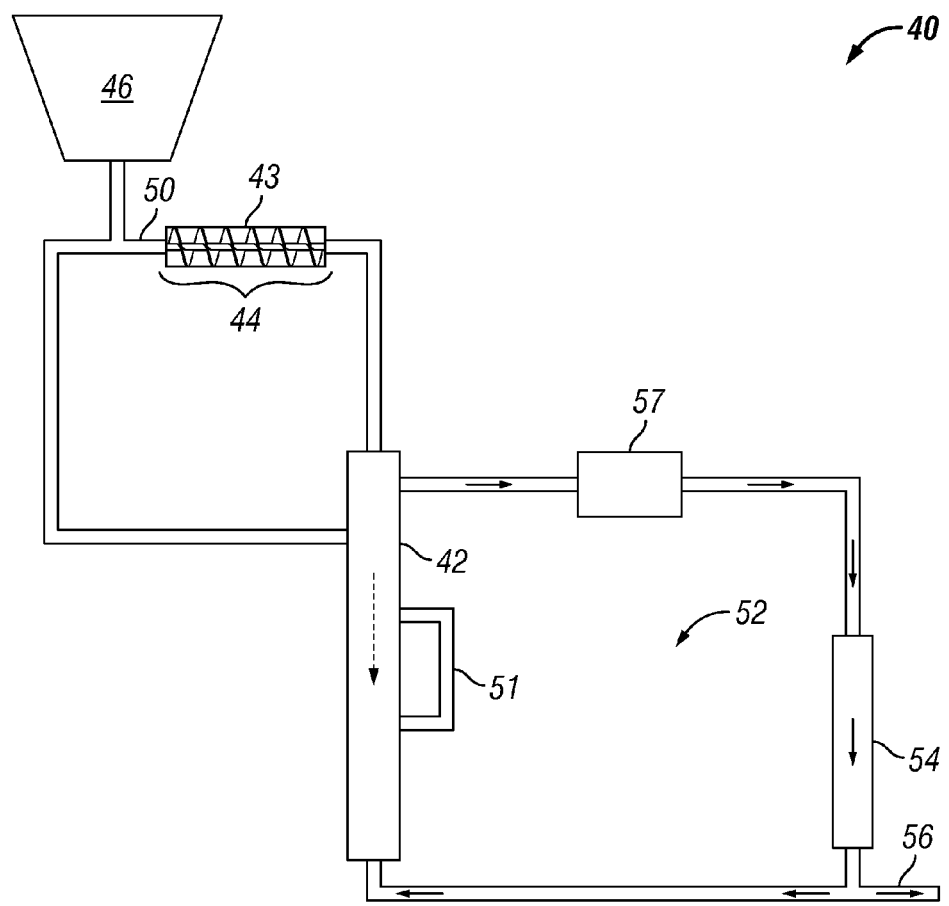
FIG. 5 shows a schematic of another illustrative embodiment of a biomass conversion system which allows a digestion unit therein to be semi-continuously loaded with biomass while operating at elevated pressures.

In still another alternative configuration, a single feeder (e.g., a screw feeder or piston-driven feeder) may be used for semi-continuous addition of biomass to a pressurized digestion unit. FIG. 5 shows a schematic of another illustrative embodiment of a biomass conversion system which allows a digestion unit therein to be semi-continuously loaded with biomass while operating at elevated pressures. In operating the biomass conversion system of FIG. 5, feeder 43 may be loaded with biomass and pressurized, and then the biomass may be transferred to digestion unit 42. Once the biomass has been transferred, feeder 43 may be at least partially depressurized, reloaded with biomass, and repressurized for use when addition of more biomass is needed. Other elements in FIG. 5 are identical to those described for FIG. 3 and accordingly will not be described further.

A number of advantages may be realized by using the above-described systems for loading biomass into a pressurized digestion unit. One advantage is that by using a liquor phase from the digestion unit and/or a surge vessel in fluid communication with the digestion unit to pressurize the pressurization zone, better heat integration may be realized. If an external solvent or gas is used for pressurization, it may be necessary to heat the biomass in the pressurization zone prior to its introduction to the digestion unit; otherwise, significant temperature variations in the digestion unit may occur, thereby resulting in process inefficiency in either case. Use of liquor phase from the digestion unit may decrease the residence time of the liquor phase in the digestion unit, thereby reducing the likelihood of degradation of soluble carbohydrates within the digestion unit. Degradation of the soluble carbohydrates may also be lessened by circulating the liquor phase through the fluid circulation loop and reacting the soluble carbohydrates to produce oxygenated intermediates in a catalytic reduction reaction unit, as previously described.

In the various embodiments described hereinabove, the pressure of the digestion unit may be maintained at a pressure of at least about 30 bar to maintain a satisfactory digestion rate. In some embodiments, the digestion unit may be maintained at a pressure ranging between about 30 bar and about 430 bar. In some embodiments, the digestion unit may be maintained at a pressure ranging between about 50 bar and about 330 bar. In some embodiments, the digestion unit may be maintained at a pressure ranging between about 70 bar and about 130 bar. In some embodiments, the digestion unit may be maintained at a pressure ranging between about 30 bar and about 130 bar. It is to be recognized that when biomass is transferred to the digestion unit from the pressurization zone, the pressure will become equalized between the two. Unless the pressures of the digestion unit and the pressurization zone are equal, there will be at least some pressure change in the digestion unit when the biomass is introduced to the digestion unit. According to the embodiments described hereinabove, the pressure of the digestion unit will either stay the same or increase, since the pressurization zone is at a pressure greater than or equal to the operating pressure of the digestion unit when transferring the biomass. Of course, in some embodiments, the pressure of the digestion unit may be adjusted after the biomass transfer, if desired.

In some embodiments, the digestion unit may be lowered slightly from its normal operating pressure prior to introducing the biomass from the pressurization zone. In some embodiments, the digestion unit may be lowered to a pressure that is at least about 75% of its normal operating pressure, and the biomass from the pressurization zone may then be introduced. In such embodiments, the digestion unit will experience a pressure increase when the biomass is introduced. In some embodiments, this pressure increase may return the digestion unit to its normal operating pressure. In other embodiments, further pressure adjustment may take place after introducing the biomass to the digestion unit.

In alternative embodiments of the present disclosure, the digestion unit may be operated at a higher pressure than the vessel holding the biomass for transfer to the digestion unit. In the description that follows, the pressurization zone of the biomass conversion system may be incorporated within the digestion unit, such that a portion of the digestion unit serves a dual role of digestion and pressure loading. In such embodiments, at least half of the digestion unit may be continuously operated at an elevated pressure, and the remainder of the digestion unit may serve dual roles in digestion and biomass loading. The portion of the digestion unit serving a dual role may cycle between an elevated pressure for biomass digestion and a lower pressure for biomass loading.

In a refinery, tower heights are limited to about 200 feet due to aviation restrictions. As a height restriction relates to the present embodiments, it ultimately represents a limitation on the amount of biomass that may be processed in the digestion unit at any one time. That is, in the embodiments described herein, the digestion unit may only be made a certain height in order to meet overall height requirements. In practice, the height of the digestion unit is even less, in the embodiments described above, since the pressurization zone and the loading vessel also need to be accommodated in the tower height. If a greater amount of the tower height could be used for active digestion, rather than for periodic loading and pressurization, higher biomass throughput could be realized. The embodiments described hereinafter may achieve this advantage, while maintaining a number of the advantages described previously hereinabove. Namely, the embodiments described hereinafter combine the functions of digestion and pressurization in a portion of the digestion unit to achieve the foregoing advantage.

In some embodiments, a biomass conversion system can comprise a first digestion unit and a second digestion unit that are operatively connected to one another; a pressure isolation mechanism between the first digestion unit and the second digestion unit; a fluid circulation loop establishing fluid communication between an outlet of the first digestion unit and an inlet of the second digestion unit; and a bypass line establishing fluid communication between an outlet of the second digestion unit and the fluid circulation loop.

Any type of suitable pressure isolation mechanism may be used in the present embodiments and may be envisioned by one having ordinary skill in the art. Suitable pressure isolation mechanisms may include, for example, ball valves, gate valves, slider gate valves, knife gate valves, trunion valves, flanges, and the like.

A primary advantage of these biomass conversion systems is that pressure may be continually maintained in the second digestion unit, while the first digestion unit plays a dual role in digesting biomass and introducing biomass to the second digestion unit. By having the first digestion unit serve in this dual role, a greater percentage of the overall tower height may be used for digestion, thereby increasing process efficiency. In some embodiments, the second digestion unit may be greater than or equal to in size to the first digestion unit.

In some embodiments, the biomass conversion systems may further comprise at least one catalytic reduction reactor unit within the fluid circulation loop. In some embodiments, the catalytic reduction reactor unit may comprise at least one catalyst that is capable of activating molecular hydrogen. Additional description of such catalysts is provided hereinbelow.

In some embodiments, the biomass conversion systems may further comprise at least one surge vessel in fluid communication with an outlet of the first digestion unit and located within the fluid circulation loop. In some embodiments, the surge vessel may be located between the first digestion unit and the catalytic reduction reactor unit.

In some embodiments, the biomass conversion systems may further comprise a loading mechanism operatively coupled to the first digestion unit. Suitable loading mechanisms have been described in more detail hereinabove.

In some embodiments, cellulosic biomass may be processed in the following manners using the foregoing biomass conversion systems.

In some embodiments, methods for processing cellulosic biomass can comprise providing biomass conversion system comprising: a first digestion unit and a second digestion unit that are operatively connected to one another; a fluid circulation loop establishing fluid communication between an outlet of the first digestion unit and an inlet of the second digestion unit; and a bypass line establishing fluid communication between an outlet of the second digestion unit and the fluid circulation loop; at least partially digesting a cellulosic biomass in, optionally, the first digestion unit and the second digestion unit, thereby forming a hydrolysate comprising soluble carbohydrates within a liquor phase; isolating the first digestion unit from the second digestion unit and then at least partially depressurizing the first digestion unit; after at least partially depressurizing the first digestion unit and while digestion continues in the second digestion unit, loading the first digestion unit with a cellulosic biomass, and re-pressurizing the first digestion unit to a pressure less than or equal to a pressure in the second digestion unit; and after re-pressurizing the first digestion unit, transferring at least a portion of the cellulosic biomass from the first digestion unit to the second digestion unit.

In some embodiments, methods for processing cellulosic biomass can comprise at least partially digesting a cellulosic biomass contained in, optionally, a first digestion unit and a second digestion unit to produce a hydrolysate comprising soluble carbohydrates in a liquor phase, the first digestion unit and the second digestion unit being operatively connected to one another; circulating the liquor phase from the first digestion unit to the second digestion unit through a fluid circulation loop establishing fluid communication between an outlet of the first digestion unit and an inlet of the second digestion unit; isolating the first digestion unit from the second digestion unit, such that the liquor phase continues to flow through the second digestion unit to the fluid circulation loop via a bypass line establishing fluid communication between an outlet of the second digestion unit and the fluid circulation loop; while hydrolysis continues in the second digestion unit, adding a cellulosic biomass to the first digestion unit and pressurizing the first digestion unit to a pressure that is less than or equal to a pressure in the second digestion unit; equalizing the pressure between the first digestion unit and the second digestion unit; and transferring at least a portion of the cellulosic biomass from the first digestion unit to the second digestion unit.

In some embodiments, after adding the cellulosic biomass to the second digestion unit, the methods may further comprise continuing the digestion of the cellulosic biomass in at least the second digestion unit at a pressure of at least about 30 bar. In some embodiments, at least about 60% of the cellulosic biomass, on a dry basis, may be digested to produce a hydrolysate comprising soluble carbohydrates. In some embodiments, at least about 90% of the cellulosic biomass, on a dry basis, may be digested to produce a hydrolysate comprising soluble carbohydrates.

Figure 6:
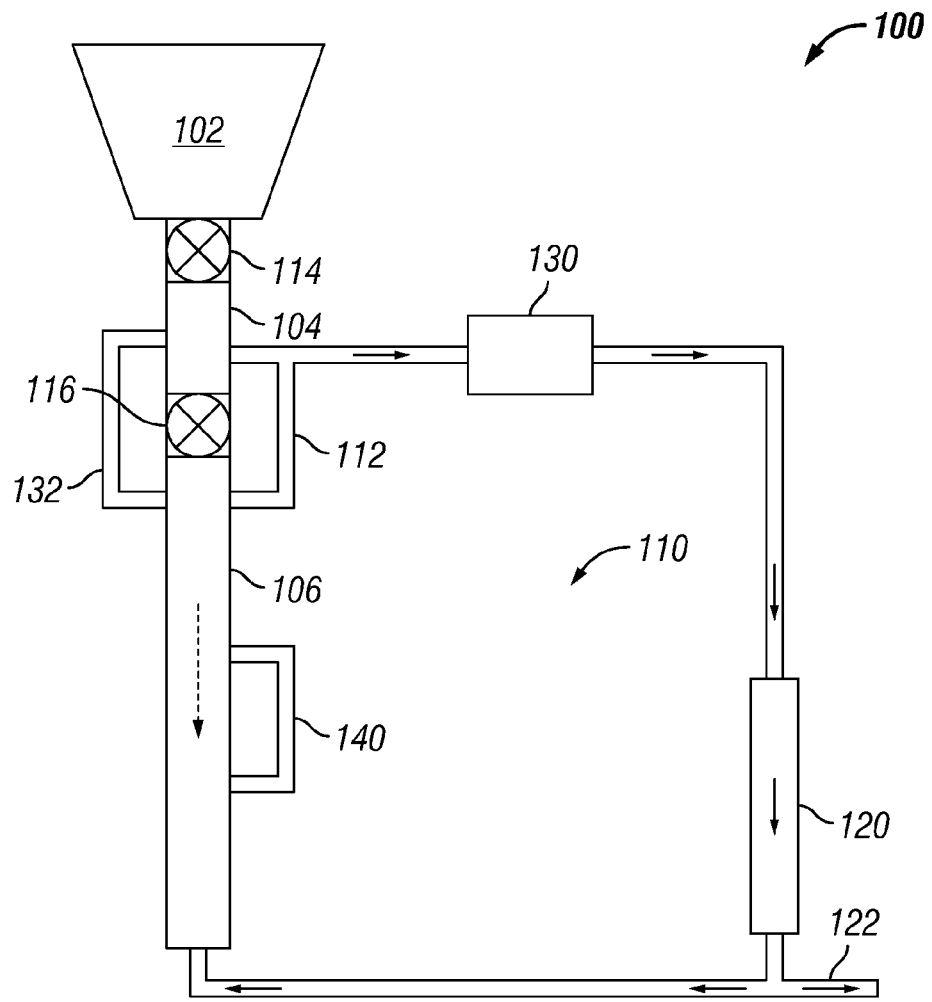
FIG. 6 shows a schematic of an illustrative biomass conversion system having a combined digestion unit/pressurization zone.

FIG. 6 shows a schematic of an illustrative biomass conversion system having a combined digestion unit/pressurization zone. Biomass conversion system 100 depicted in FIG. 6 contains loading vessel 102, digestion unit 104 and digestion unit 106, connected to each other in sequential series. Digestion unit 104 is separated from loading vessel 102 by valve 114, and from digestion unit 106 by valve 116. Digestion unit 104 is connected to fluid circulation loop 110 that establishes fluid communication between an outlet of digestion unit 104 and an inlet of digestion unit 106. When valve 116 is closed, digestion units 104 and 106 are isolated from one another, although a liquor phase may continue to circulate within fluid circulation loop 110 via bypass line 112.

Within fluid circulation loop 110 there may be at least one catalytic reduction reactor unit 120 that may convert a hydrolysate produced in digestion units 104 and 106 into a reaction product, which may be subsequently transformed into a biofuel. In an embodiment, catalytic reduction reactor unit 120 may perform a hydrogenolysis reaction. The reaction product from catalytic reduction reactor unit 120 may be recirculated to digestion unit 106 and/or removed from fluid circulation loop 110 via takeoff line 122 and further processed, for example, into a biofuel.

In some embodiments, fluid circulation loop 110 may be configured such that a fluid therein may enter digestion unit 106 with countercurrent flow. It is to be recognized, however, that fluid circulation loop 110 may connect with digestion unit 106 such that any type of flow configuration may be established. Optional line 140 may circulate liquor phase from a first location to a second location in digestion unit 106.

In some embodiments, the biomass conversion systems may further contain a surge vessel with the fluid circulation loop. As depicted in FIG. 6, surge vessel 130 may be located within fluid circulation loop 110 between digestion unit 104 and catalytic reactor unit 120. Among the reasons that one would want to include a surge vessel in the biomass conversion systems is to regulate flow rates within fluid circulation loop 110 that occur as a result of pressure variations within the system. These pressure variations may occur during the operation of the system as biomass is added, as discussed in more detail hereinbelow.

In the embodiment depicted in FIG. 6, digestion unit 104 may serve a dual function in enabling the loading of digestion unit 106 with biomass, while operating as a digestion unit when not being used to load digestion unit 106. That is, digestion unit 104 combines the functions of a pressurization zone and a portion of the digestion unit. When not being loaded, digestion units 104 and 106 may effectively function as a single larger digestion unit. As described previously, this dual function of digestion unit 104 allows a greater amount of the height of biomass conversion system 100 to be used for digestion purposes, which may enable larger quantities of biomass to be processed at a single time.

In some embodiments, the biomass conversion system depicted in FIG. 6 may be operated as follows. Biomass may be placed in digestion units 104 and 106, and the digestion process may be started in the presence of a digestion solvent. A hydrolysate produced from the biomass may be circulated through fluid circulation loop 110 and at least partially converted to a reaction product in catalytic reduction reactor unit 120, and at least a portion of the reaction product may then be recirculated to digestion unit 106. In some embodiments, the liquor phase entering digestion unit 106 may enter such that countercurrent flow is established for heat management purposes. While digestion is taking place, valve 116 is open such that liquor phase flows through both digestion units 104 and 106, which effectively function as a single larger digestion unit.

When it is desired to add more biomass to digestion unit 106, valve 116 may be closed such that the circulating liquor phase no longer enters digestion unit 104, but instead passes from digestion unit 106 directly to fluid circulation loop 110 by bypass line 112. That is, digestion units 104 and 106 may be pressure isolated from one another. Once valve 116 has been closed, digestion unit 104 may be at least partially depressurized while digestion unit 106 remains at its normal elevated operating pressure (e.g., about 30 bar or greater).

It is to be noted that the decision to add more biomass to digestion unit 106 may take place in response to a number of different triggers. In some embodiments, addition may take place periodically at fixed time points. In some embodiments, addition may take place manually in response to operator input. In still other embodiments, addition may take place in response to a sensor within the second digestion unit. For example, in some embodiments, when a biomass quantity within digestion unit 106 falls below a pre-determined level, valve 116 may be closed to initiate the introduction of additional biomass.

Once digestion unit 104 has been at least partially depressurized, additional biomass may be added to digestion unit 104 via loading vessel 102. At this point, valve 114 may again be closed and digestion unit 104 may be repressurized. A liquor phase may be introduced to the biomass within digestion unit 104 before pressurization. In some embodiments, the liquor phase may come from digestion unit 106 via line 132. In other embodiments, the liquor phase may come from an external source. As described above, pressurizing the biomass in digestion unit 104 may have numerous process advantages that may result in more efficient digestion. In some embodiments, a gas may be used to further pressurize digestion unit 104. In some embodiments, digestion unit 104 may be pressurized to a pressure up to that at which digestion unit 106 is operating. That is, when used for loading, digestion unit 104 is typically maintained at a pressure less than or equal to that of the operating pressure of digestion unit 106.

Once digestion unit 104 has been pressurized for a suitable length of time (e.g., to infiltrate the biomass with liquor phase), valve 116 may again be opened. In embodiments in which digestion unit 106 is at a higher pressure than digestion unit 104, there will be a fluid surge from digestion unit 106 to digestion unit 104 as the pressure equalizes between the digestion units. Once the pressure equalizes, at least a portion of the biomass in digestion unit 104 may drop to digestion unit 106 to replenish that consumed by the ongoing digestion. At this point, fluid circulation may continue between digestion unit 104, digestion unit 106 and fluid circulation loop 110, with bypass line 112 no longer being used to maintain fluid circulation. In this manner, digestion may continue in digestion unit 106 without interruption or depressurization. Again, this is a highly advantageous aspect for a cost- and energy-efficient conversion of biomass into a biofuel.

When a fluid surge occurs from digestion unit 106 to digestion unit 104, there may be a flow variance in fluid circulation loop 110. Flow variances of this type may make system control difficult, and may sometimes be detrimental for downstream catalytic reactor units. In this regard, it is advantageous include surge vessel 130 within fluid circulation loop 110. Inclusion of surge vessel 130 may stabilize the flow within fluid circulation loop 110 by primarily retaining the flow variance to within surge vessel 130 before it reaches catalytic reduction reactor unit 120.

In the various embodiments described herein, the digestion unit may typically be maintained at a pressure of at least about 30 bar to ensure that digestion takes place at a desired rate. In some embodiments, the digestion unit may be maintained at a pressure ranging between about 30 bar and about 430 bar. In some embodiments, the digestion unit may be maintained at a pressure ranging between about 50 bar and about 330 bar. In some embodiments, the digestion unit may be maintained at a pressure ranging between about 70 bar and about 130 bar. In still other embodiments, the digestion unit may be maintained at a pressure ranging between about 30 bar and about 130 bar. It is to be noted that the foregoing pressures refer to the pressures at which digestion takes place. That is, the foregoing pressures refer to normal operating pressures for the digestion unit. In more particular embodiments, the second digestion may be maintained at a pressure of at least 30 bar, or at least about 50 bar, or at least about 70 bar.

In embodiments in which a pressurization zone is used for introducing the biomass into the digestion unit, the pressurization zone is generally pressurized to a pressure greater than or equal to that of the digestion unit, once biomass has been introduced to the pressurization zone. At this pressure differential, the biomass may experience pressure-assisted transfer to the digestion unit when the pressure is equalized.

In embodiments, in which two or more digestion units are connected together and one of the digestion units is used dually for digesting and introducing biomass into the other digestion unit, the pressure in the digestion unit used for pressurizing is typically maintained at a pressure that is less than or equal to that of the other digestion unit. As noted above, at this pressure differential, the liquor and biomass being digested in the second digestion unit will experience surge to the first digestion unit when the valve between them is opened. After the pressure equalizes, at least a portion of the biomass and liquor phase in the first digestion unit may then be transferred by gravity drop to the second digestion unit. At this point, the biomass level in the second digestion unit will have been restored, without requiring a return of the second digestion unit to atmospheric pressure for loading, and digestion may then continue in both digestion units.

In some embodiments, the methods described herein may further comprise converting the hydrolysate into a biofuel. In some embodiments, conversion of the hydrolysate into a biofuel may begin with a catalytic hydrogenolysis reaction to transform soluble carbohydrates produced from digestion into a reaction product comprising oxygenated intermediates, as described above. As described above and depicted in FIGS. 1-6, the reaction product may be recirculated to the digestion unit to further aid in the digestion process. In some embodiments, the reaction product may be further transformed by any number of further catalytic reforming reactions including, for example, further catalytic reduction reactions (e.g., hydrogenolysis reactions, hydrogenation reactions, hydrotreating reactions, and the like), condensation reactions, isomerization reactions, desulfurization reactions, dehydration reactions, oligomerization reactions, alkylation reactions, and the like. A description of the initial hydrogenolysis reaction and the further catalytic reforming reactions are described hereinafter.

Various processes are known for performing hydrogenolysis of carbohydrates. One suitable method includes contacting a carbohydrate or stable hydroxyl intermediate with hydrogen, optionally mixed with a diluent gas, and a hydrogenolysis catalyst under conditions effective to form a reaction product comprising oxygenated intermediates such as, for example, smaller molecules or polyols. As used herein, the term "smaller molecules or polyols" includes any molecule that having a lower molecular weight, which may include a smaller number of carbon atoms or oxygen atoms, than the starting carbohydrate. In an embodiment, the reaction products may include smaller molecules such as, for example, polyols and alcohols. This aspect of hydrogenolysis entails the breaking of carbon-carbon bonds In an embodiment, a soluble carbohydrate may be converted to relatively stable oxygenated intermediates such as, for example, propylene glycol, ethylene glycol, and glycerol using a hydrogenolysis reaction in the presence of a catalyst that is capable of activating molecular hydrogen. Suitable catalysts may include, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession, such as the hydrogenation of a carbonyl group to form an alcohol. The catalyst may also include a carbonaceous pyropolymer catalyst containing transition metals (e.g., chromium, molybdenum, tungsten, rhenium, manganese, copper, and cadmium) or Group VIII metals (e.g., iron, cobalt, nickel, platinum, palladium, rhodium, ruthenium, iridium, and osmium). In certain embodiments, the catalyst may include any of the above metals combined with an alkaline earth metal oxide or adhered to a catalytically active support. In certain embodiments, the catalyst described in the hydrogenolysis reaction may include a catalyst support.

The conditions for which to carry out the hydrogenolysis reaction will vary based on the type of biomass starting material and the desired products (e.g. gasoline or diesel), for example. One of ordinary skill in the art, with the benefit of this disclosure, will recognize the appropriate conditions to use to carry out the reaction. In general, the hydrogenolysis reaction may be conducted at temperatures in the range of about 110° C. to about 300° C., and preferably from about 170° C. to about 300° C., and most preferably from about 180° C. to about 290° C.

In an embodiment, the hydrogenolysis reaction may be conducted under basic conditions, preferably at a pH of about 8 to about 13, and even more preferably at a pH of about 10 to about 12. In an embodiment, the hydrogenolysis reaction may be conducted at a pressure ranging between about 1 bar (absolute) and about 150 bar, and preferably at a pressure ranging between about 15 bar and about 140 bar, and even more preferably at a pressure ranging between 50 bar and 110 bar.

The hydrogen used in the hydrogenolysis reaction may include external hydrogen, recycled hydrogen, in situ generated hydrogen, or any combination thereof.

In some embodiments, the reaction products of the hydrogenolysis reaction may comprise greater than about 25% by mole, or alternatively, greater than about 30% by mole of polyols, which may result in a greater conversion to a biofuel in a subsequent processing reaction.

In some embodiments, hydrogenolysis may be conducted under neutral or acidic conditions, as needed to accelerate hydrolysis reactions in addition to the hydrogenolysis reaction. For example, hydrolysis of oligomeric carbohydrates may be combined with hydrogenation to produce sugar alcohols, which may undergo hydrogenolysis.

A second aspect of hydrogenolysis entails the breaking of —OH bonds such as: $RC(H)_2—OH+H_2 \rightarrow RCH_3+H_2O$. This reaction is also called "hydrodeoxygenation," and may occur in parallel with C—C bond breaking hydrogenolysis. Diols may be converted to mono-oxygenates via this reaction. As reaction severity is increased with increased temperature or contact time with catalyst, the concentration of polyols and diols relative to mono-oxygenates may diminish as a result of hydrodeoxygenation. Selectivity for C—C vs. C—OH bond hydrogenolysis will vary with catalyst type and formulation. Full de-oxygenation to alkanes may also occur, but is generally undesirable if the intent is to produce mono-oxygenates or diols and polyols which may be condensed or oligomerized to higher molecular weight compounds in a subsequent processing step. Typically, it is desirable to send only mono-oxygenates or diols to subsequent processing steps, as higher polyols may lead to excessive coke formation during condensation or oligomerization. Alkanes, in contrast, are essentially unreactive and cannot be readily combined to produce higher molecular compounds Once oxygenated intermediates have been formed by a hydrogenolysis reaction, a portion of the reaction product may be recirculated to the digestion unit to serve as an internally generated digestion solvent. Another portion of the reaction product may be withdrawn and subsequently processed by further reforming reactions to form a biofuel. Before being subjected to the further reforming reactions, the oxygenated intermediates may optionally be separated into different components. Suitable separations may include, for example, phase separation, solvent stripping columns, extractors, filters, distillations and the like. In some embodiments, a separation of lignin from the oxygenated intermediates before the reaction product is subsequently processed further or recirculated to the digestion unit.

The oxygenated intermediates may be processed to produce a fuel blend in one or more processing reactions. In an embodiment, a condensation reaction may be used along with other reactions to generate a fuel blend and may be catalyzed by a catalyst comprising an acid, a base, or both. In general, without being limited to any particular theory, it is believed that the basic condensation reactions may involve a series of steps involving: (1) an optional dehydrogenation reaction; (2) an optional dehydration reaction that may be acid catalyzed; (3) an aldol condensation reaction; (4) an optional ketonization reaction; (5) an optional furanic ring opening reaction;

(6) hydrogenation of the resulting condensation products to form a ≥$C_4$ hydrocarbon; and (7) any combination thereof. Acid catalyzed condensations may similarly entail optional hydrogenation or dehydrogenation reactions, dehydration, and oligomerization reactions. Additional polishing reactions may also be used to conform the product to a specific fuel standard, including reactions conducted in the presence of hydrogen and a hydrogenation catalyst to remove functional groups from final fuel product. In some embodiments, a basic catalyst, a catalyst having both an acid and a base functional site, and optionally comprising a metal function, may also be used to effect the condensation reaction.

In some embodiments, an aldol condensation reaction may be used to produce a fuel blend meeting the requirements for a diesel fuel or jet fuel. Traditional diesel fuels are petroleum distillates rich in paraffinic hydrocarbons. They have boiling ranges as broad as 187° C. to 417° C., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 may be defined as diesel fuel.

The present disclosure also provides methods to produce jet fuel. Jet fuel is clear to straw colored. The most common fuel is an unleaded/paraffin oil-based fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosene-type Airplane fuel (including Jet A and Jet A-1) has a carbon number distribution between about $C_8$ and $C_{16}$. Wide-cut or naphtha-type Airplane fuel (including Jet B) typically has a carbon number distribution between about $C_5$ and $C_{15}$. A fuel blend meeting ASTM D1655 may be defined as jet fuel.

In certain embodiments, both Airplanes (Jet A and Jet B) contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors (e.g., DCI-4A) are used for civilian and military fuels, and DCI-6A is used for military fuels. FSII agents, include, for example, Di-EGME.

In some embodiments, the oxygenated intermediates may comprise a carbonyl-containing compound that may take part in a base catalyzed condensation reaction. In some embodiments, an optional dehydrogenation reaction may be used to increase the amount of carbonyl-containing compounds in the oxygenated intermediate stream to be used as a feed to the condensation reaction. In these embodiments, the oxygenated intermediates and/or a portion of the bio-based feedstock stream may be dehydrogenated in the presence of a catalyst.

In some embodiments, a dehydrogenation catalyst may be preferred for an oxygenated intermediate stream comprising alcohols, diols, and triols. In general, alcohols cannot participate in aldol condensation directly. The hydroxyl group or groups present may be converted into carbonyls (e.g., aldehydes, ketones, etc.) in order to participate in an aldol condensation reaction. A dehydrogenation catalyst may be included to effect dehydrogenation of any alcohols, diols, or polyols present to form ketones and aldehydes. The dehydration catalyst is typically formed from the same metals as used for hydrogenation, hydrogenolysis, or aqueous phase reforming. These catalysts are described in more detail above. Dehydrogenation yields may be enhanced by the removal or consumption of hydrogen as it forms during the reaction. The dehydrogenation step may be carried out as a separate reaction step before an aldol condensation reaction, or the dehydrogenation reaction may be carried out in concert with the aldol condensation reaction. For concerted dehydrogenation and aldol condensation reactions, the dehydrogenation and aldol condensation functions may take place on the same catalyst. For example, a metal hydrogenation/dehydrogenation functionality may be present on catalyst comprising a basic functionality.

The dehydrogenation reaction may result in the production of a carbonyl-containing compound. Suitable carbonyl-containing compounds may include, but are not limited to, any compound comprising a carbonyl functional group that may form carbanion species or may react in a condensation reaction with a carbanion species. In an embodiment, a carbonyl-containing compound may include, but is not limited to, ketones, aldehydes, furfurals, hydroxy carboxylic acids, and, carboxylic acids. Ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2, 3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, dihydroxyacetone, and isomers thereof. Aldehydes may include, without limitation, hydroxyaldehydes, acetaldehyde, glyceraldehyde, propionaldehyde, butyraldehyde, pentanal, hexanal, heptanal, octanal, nonal, decanal, undecanal, dodecanal, and isomers thereof. Carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Furfurals may include, without limitation, hydroxylmethylfurfural, 5-hydroxymethyl-2(5H)-furanone, dihydro-5-(hydroxymethyl)-2 (3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof. In an embodiment, the dehydrogenation reaction may result in the production of a carbonyl-containing compound that is combined with the oxygenated intermediates to become a part of the oxygenated intermediates fed to the condensation reaction.

In an embodiment, an acid catalyst may be used to optionally dehydrate at least a portion of the oxygenated intermediate stream. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in solution.

In some embodiments, the dehydration reaction may occur in the vapor phase. In other embodiments, the dehydration reaction may occur in the liquid phase. For liquid phase dehydration reactions, an aqueous solution may be used to carry out the reaction. In an embodiment, other solvents in addition to water, may be used to form the aqueous solution. For example, water soluble organic solvents may be present. Suitable solvents may include, but are not limited to, hydroxymethylfurfural (HMF), dimethylsulfoxide (DMSO), 1-methyl-n-pyrollidone (NMP), and any combination thereof. Other suitable aprotic solvents may also be used alone or in combination with any of these solvents.

In an embodiment, the processing reactions may comprise an optional ketonization reaction. A ketonization reaction may increase the number of ketone functional groups within at least a portion of the oxygenated intermediates. For example, an alcohol may be converted into a ketone in a ketonization reaction. Ketonization may be carried out in the presence of a basic catalyst. Any of the basic catalysts described above as the basic component of the aldol condensation reaction may be used to effect a ketonization reaction. Suitable reaction conditions are known to one of ordinary skill in the art and generally correspond to the reaction conditions listed above with respect to the aldol condensation reaction. The ketonization reaction may be carried out as a separate reaction step, or it may be carried out in concert with the aldol condensation reaction. The inclusion of a basic functional site on the aldol condensation catalyst may result in concerted ketonization and aldol condensation reactions.

In an embodiment, the processing reactions may comprise an optional furanic ring opening reaction. A furanic ring opening reaction may result in the conversion of at least a portion of any oxygenated intermediates comprising a furanic ring into compounds that are more reactive in an aldol condensation reaction. A furanic ring opening reaction may be carried out in the presence of an acidic catalyst. Any of the acid catalysts described above as the acid component of the aldol condensation reaction may be used to effect a furanic ring opening reaction. Suitable reaction conditions are known to one of ordinary skill in the art and generally correspond to the reaction conditions listed above with respect to the aldol condensation reaction. The furanic ring opening reaction may be carried out as a separate reaction step, or it may be carried out in concert with the aldol condensation reaction. The inclusion of an acid functional site on the aldol condensation catalyst may result in a concerted furanic ring opening reaction and aldol condensation reactions. Such an embodiment may be advantageous as any furanic rings may be opened in the presence of an acid functionality and reacted in an aldol condensation reaction using a basic functionality. Such a concerted reaction scheme may allow for the production of a greater amount of higher hydrocarbons to be formed for a given oxygenated intermediate feed.

In an embodiment, production of a $\geq C_4$ compound may occur by condensation, which may include aldol condensation of the oxygenated intermediates in the presence of a condensation catalyst. Aldol-condensation generally involves the carbon-carbon coupling between two compounds, at least one of which may contain a carbonyl group, to form a larger organic molecule. For example, acetone may react with hydroxymethylfurfural to form a $C_9$ species, which may subsequently react with another hydroxymethylfurfural molecule to form a $C_{15}$ species. In various embodiments, the reaction is usually carried out in the presence of a condensation catalyst. The condensation reaction may be carried out in the vapor or liquid phase. In an embodiment, the reaction may take place at a temperature ranging from about 7° C. to about 377° C. depending on the reactivity of the carbonyl group.

The condensation catalyst will generally be a catalyst capable of forming longer chain compounds by linking two molecules through a new carbon-carbon bond, such as a basic catalyst, a multi-functional catalyst having both acid and base functionalities, or either type of catalyst also comprising an optional metal functionality. In an embodiment, the multi-functional catalyst may be a catalyst having both a strong acid and a strong base functionalities. In an embodiment, aldol catalysts may comprise Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In an embodiment, the base catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In an embodiment, the condensation catalyst comprises mixed-oxide base catalysts. Suitable mixed-oxide base catalysts may comprise a combination of magnesium, zirconium, and oxygen, which may comprise, without limitation: Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combinations thereof. Different atomic ratios of Mg/Zr or the combinations of various other elements constituting the mixed oxide catalyst may be used ranging from about 0.01 to about 50. In an embodiment, the condensation catalyst may further include a metal or alloys comprising metals, such as Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Such metals may be preferred when a dehydrogenation reaction is to be carried out in concert with the aldol condensation reaction. In an embodiment, preferred Group IA materials may include Li, Na, K, Cs and Rb. In an embodiment, preferred Group IIA materials may include Mg, Ca, Sr and Ba. In an embodiment, Group IIB materials may include Zn and Cd. In an embodiment, Group IIIB materials may include Y and La. Basic resins may include resins that exhibit basic functionality. The basic catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In one embodiment, the condensation catalyst may be derived from the combination of MgO and $Al_2O_3$ to form a hydrotalcite material. Another preferred material contains ZnO and $Al_2O_3$ in the form of a zinc aluminate spinel. Yet another preferred material is a combination of ZnO, $Al_2O_3$, and CuO. Each of these materials may also contain an additional metal function provided by a Group VIIIB metal, such as Pd or Pt. Such metals may be preferred when a dehydrogenation reaction is to be carried out in concert with the aldol condensation reaction. In one embodiment, the basic catalyst may be a metal oxide containing Cu, Ni, Zn, V, Zr, or mixtures thereof. In another embodiment, the basic catalyst may be a zinc aluminate metal containing Pt, Pd Cu, Ni, or mixtures thereof.

In some embodiments, a base-catalyzed condensation reaction may be performed using a condensation catalyst with both an acidic and basic functionality. The acid-aldol condensation catalyst may comprise hydrotalcite, zinc-aluminate, phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the acid-base catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and combinations thereof. In an embodiment, the acid-base catalyst may include a metal functionality provided by Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. In one embodiment, the catalyst further includes Zn, Cd or phosphate. In one embodiment, the condensation catalyst may be a metal oxide containing Pd, Pt, Cu or Ni, and even more preferably an aluminate or zirconium metal oxide containing Mg and Cu, Pt, Pd or Ni. The acid-base catalyst may also include a hydroxyapatite (HAP) combined with any one or more of the above metals. The acid-base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In an embodiment, the condensation catalyst may also include zeolites and other microporous supports that contain Group IA compounds, such as Li, NA, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In one embodiment, the condensation catalyst may be derived from the combination of MgO and $Al_2O_3$ to form a hydrotalcite material. Another preferred material may contain a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation catalyst may be self-supporting (i.e., the catalyst does not need another material to serve as a support), or may require a separate support suitable for suspending the catalyst in the reactant stream. One exemplary support is silica, especially silica having a high surface area (greater than 100 square meters per gram), obtained by sol-gel synthesis, precipitation, or fuming. In other embodiments, particularly when the condensation catalyst is a powder, the catalyst system may include a binder to assist in forming the catalyst into a desirable catalyst shape. Applicable forming processes may include extrusion, pelletization, oil dropping, or other known processes. Zinc oxide, alumina, and a peptizing agent may also be mixed together and extruded to produce a formed material. After drying, this material may be calcined at a temperature appropriate for formation of the catalytically active phase. Other catalyst supports as known to one having ordinary skill in the art may also be used.

In some embodiments, a dehydration catalyst, a dehydrogenation catalyst, and the condensation catalyst may be present in the same reactor as the reaction conditions overlap to some degree. In these embodiments, a dehydration reaction and/or a dehydrogenation reaction may occur substantially simultaneously with the condensation reaction. In some embodiments, a catalyst may comprise active sites for a dehydration reaction and/or a dehydrogenation reaction in addition to a condensation reaction. For example, a catalyst may comprise active metals for a dehydration reaction and/or a dehydrogenation reaction along with a condensation reaction at separate sites on the catalyst or as alloys. Suitable active elements may comprise any of those listed above with respect to the dehydration catalyst, dehydrogenation catalyst, and the condensation catalyst. Alternately, a physical mixture of dehydration, dehydrogenation, and condensation catalysts may be employed. While not intending to be limited by theory, it is believed that using a condensation catalyst comprising a metal and/or an acid functionality may assist in pushing the equilibrium limited aldol condensation reaction towards completion. Advantageously, this may be used to effect multiple condensation reactions with dehydration and/or dehydrogenation of intermediates, in order to form (via condensation, dehydration, and/or dehydrogenation) higher molecular weight oligomers as desired to produce jet or diesel fuel.

The specific $\geq C_4$ compounds produced in the condensation reaction may depend on various factors, including, without limitation, the type of oxygenated intermediates in the reactant stream, condensation temperature, condensation pressure, the reactivity of the catalyst, and the flow rate of the reactant stream.

In general, the condensation reaction may be carried out at a temperature at which the thermodynamics of the proposed reaction are favorable. For condensed phase liquid reactions, the pressure within the reactor must be sufficient to maintain at least a portion of the reactants in the condensed liquid phase at the reactor inlet. For vapor phase reactions, the reaction should be carried out at a temperature where the vapor pressure of the oxygenates is at least about 0.1 bar, and the thermodynamics of the reaction are favorable. The condensation temperature will vary depending upon the specific oxygenated intermediates used, but may generally range between about 75° C. and about 500° C. for reactions taking place in the vapor phase, and more preferably range between about 125° C. and about 450° C. For liquid phase reactions, the condensation temperature may range between about 5° C. and about 475° C., and the condensation pressure may range between about 0.01 bar and about 100 bar. Preferably, the condensation temperature may range between about 15° C. and about 300° C., or between about 15° C. and about 250° C.

Varying the factors above, as well as others, will generally result in a modification to the specific composition and yields of the $\geq C_4$ compounds. For example, varying the temperature and/or pressure of the reactor system, or the particular catalyst formulations, may result in the production of $\geq C_4$ alcohols and/or ketones instead of $\geq C_4$ hydrocarbons. The $\geq C_4$ hydrocarbon product may also contain a variety of olefins, and alkanes of various sizes (typically branched alkanes). Depending upon the condensation catalyst used, the hydrocarbon product may also include aromatic and cyclic hydrocarbon compounds. The $\geq C_4$ hydrocarbon product may also contain undesirably high levels of olefins, which may lead to coking or deposits in combustion engines, or other undesirable hydrocarbon products. In such cases, the hydrocarbons may optionally be hydrogenated to reduce the ketones to alcohols and hydrocarbons, while the alcohols and olefinic hydrocarbons may be reduced to alkanes, thereby forming a more desirable hydrocarbon product having reduced levels of olefins, aromatics or alcohols.

The condensation reactions may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reactions.

In a continuous flow system, the reactor system may include an optional dehydrogenation bed adapted to produce dehydrogenated oxygenated intermediates, an optional dehydration bed adapted to produce dehydrated oxygenated intermediates, and a condensation bed adapted to produce $\geq C_4$ compounds from the oxygenated intermediates. The dehydrogenation bed may be configured to receive the reactant stream and produce the desired oxygenated intermediates, which may have an increase in the amount of carbonyl-containing compounds. The dehydration bed may be configured to receive the reactant stream and produce the desired oxygenated intermediates. The condensation bed may be configured to receive the oxygenated intermediates for contact with the condensation catalyst and production of the desired $\geq C_4$ compounds. For systems with one or more finishing steps, an additional reaction bed for conducting the finishing process or processes may be included after the condensation bed.

In an embodiment, the optional dehydration reaction, the optional dehydrogenation reaction, the optional ketonization reaction, the optional ring opening reaction, and the condensation reaction catalyst beds may be positioned within the same reactor vessel or in separate reactor vessels in fluid communication with each other. Each reactor vessel preferably may include an outlet adapted to remove the product stream from the reactor vessel. For systems with one or more finishing steps, the finishing reaction bed or beds may be within the same reactor vessel along with the condensation bed or in a separate reactor vessel in fluid communication with the reactor vessel having the condensation bed.

In an embodiment, the reactor system also may include additional outlets to allow for the removal of portions of the reactant stream to further advance or direct the reaction to the desired reaction products, and to allow for the collection and recycling of reaction byproducts for use in other portions of the system. In an embodiment, the reactor system also may include additional inlets to allow for the introduction of supplemental materials to further advance or direct the reaction to the desired reaction products, and to allow for the recycling of reaction byproducts for use in other reactions.

In an embodiment, the reactor system also may include elements which allow for the separation of the reactant stream into different components which may find use in different reaction schemes or to simply promote the desired reactions. For instance, a separator unit, such as a phase separator, extractor, purifier or distillation column, may be installed prior to the condensation step to remove water from the reactant stream for purposes of advancing the condensation reaction to favor the production of higher hydrocarbons. In an embodiment, a separation unit may be installed to remove specific intermediates to allow for the production of a desired product stream containing hydrocarbons within a particular carbon number range, or for use as end products or in other systems or processes.

The condensation reaction may produce a broad range of compounds with carbon numbers ranging from $C_4$ to $C_{30}$ or greater. Exemplary compounds may include, for example, $\geq C_4$ alkanes, $\geq C_4$ alkenes, $\geq C_5$ cycloalkanes, $\geq C_5$ cycloalkenes, aryls, fused aryls, $\geq C_4$ alcohols, $\geq C_4$ ketones, and mixtures thereof. The $\geq C_4$ alkanes and $\geq C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The $\geq C_4$ alkanes and $\geq C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various $\geq C_4$ alkanes and $\geq C_4$ alkenes may include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The $\geq C_5$ cycloalkanes and $\geq C_5$ cycloalkenes may have from 5 to about 30 carbon atoms and may be unsubstituted, mono-substituted or multi-substituted. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_1$ alkylene, a straight chain $\geq C_2$ alkylene, an aryl group, or a combination thereof. In one embodiment, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet another embodiment, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of desirable $\geq C_5$ cycloalkanes and $\geq C_5$ cycloalkenes may include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

Aryl groups contain an aromatic hydrocarbon in either an unsubstituted (phenyl), mono-substituted or multi-substituted form. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C2$ alkylene, a phenyl group, or a combination thereof. In one embodiment, at least one of the substituted groups may include a branched $C_3$-$C_{12}$ alkyl, a straight chain $C_1$-$C_{12}$ alkyl, a branched $C_3$-$C_{12}$ alkylene, a straight chain $C_2$-$C_{12}$ alkylene, a phenyl group, or any combination thereof. In yet another embodiment, at least one of the substituted groups may include a branched $C_3$-$C_4$ alkyl, a straight chain $C_1$-$C_4$ alkyl, a branched $C_3$-$C_4$ alkylene, a straight chain $C_2$-$C_4$ alkylene, a phenyl group, or any combination thereof. Examples of various aryl compounds may include, without limitation, benzene, toluene, xylene (dimethylbenzene), ethyl benzene, para-xylene, meta-xylene, ortho-xylene, and C9 aromatics.

Fused aryls contain bicyclic and polycyclic aromatic hydrocarbons, in either an unsubstituted, mono-substituted or multi-substituted form. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_2$ alkylene, a phenyl group, or a combination thereof. In another embodiment, at least one of the substituted groups may include a branched $C_3$-$C_4$ alkyl, a straight chain $C_1$-$C_4$ alkyl, a branched $C_3$-$C_4$ alkylene, a straight chain $C_2$-$C_4$ alkylene, a phenyl group, or any combination thereof. Examples of various fused aryls may include, without limitation, naphthalene, anthracene, tetrahydronaphthalene, and decahydronaphthalene, indane, indene, and isomers thereof.

The moderate fractions, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The $\geq C_4$ compounds may also find use as industrial chemicals, whether as an intermediate or an end product. For example, the aryls toluene, xylene, ethylbenzene, para-xylene, meta-xylene, and ortho-xylene may find use as chemical intermediates for the production of plastics and other products. Meanwhile, $C_9$ aromatics and fused aryls, such as naphthalene, anthracene, tetrahydronaphthalene, and decahydronaphthalene, may find use as solvents in industrial processes.

In an embodiment, additional processes may be used to treat the fuel blend to remove certain components or further conform the fuel blend to a diesel or jet fuel standard. Suitable techniques may include hydrotreating to reduce the amount of or remove any remaining oxygen, sulfur, or nitrogen in the fuel blend. The conditions for hydrotreating a hydrocarbon stream are known to one of ordinary skill in the art.

In an embodiment, hydrogenation may be carried out in place of or after the hydrotreating process to saturate at least some olefinic bonds. In some embodiments, a hydrogenation reaction may be carried out in concert with the aldol condensation reaction by including a metal functional group with the aldol condensation catalyst. Such hydrogenation may be performed to conform the fuel blend to a specific fuel standard (e.g., a diesel fuel standard or a jet fuel standard). The hydrogenation of the fuel blend stream may be carried out according to known procedures, either with the continuous or batch method. The hydrogenation reaction may be used to remove remaining carbonyl groups and/or hydroxyl groups. In such cases, any of the hydrogenation catalysts described above may be used. In general, the finishing step may be carried out at finishing temperatures ranging between about 80° C. and about 250° C., and finishing pressures may range between about 5 bar and about 150 bar. In one embodiment, the finishing step may be conducted in the vapor phase or liquid phase, and use, external hydrogen, recycled hydrogen, or combinations thereof, as necessary.

In an embodiment, isomerization may be used to treat the fuel blend to introduce a desired degree of branching or other shape selectivity to at least some components in the fuel blend. It may also be useful to remove any impurities before the hydrocarbons are contacted with the isomerization catalyst. The isomerization step may comprise an optional stripping step, wherein the fuel blend from the oligomerization reaction may be purified by stripping with water vapor or a suitable gas such as light hydrocarbon, nitrogen or hydrogen. The optional stripping step may be carried out in a countercurrent manner in a unit upstream of the isomerization catalyst, wherein the gas and liquid are contacted with each other, or before the actual isomerization reactor in a separate stripping unit utilizing countercurrent principle.

After the optional stripping step the fuel blend may be passed to a reactive isomerization unit comprising one or more catalyst beds. The catalyst beds of the isomerization unit may operate either in co-current or countercurrent manner. In the isomerization unit, the pressure may vary between about 20 bar to about 150 bar, preferably between about 20 bar to about 100 bar, the temperature ranging between about 195° C. and about 500° C., preferably between about 300° C. and about 400° C. In the isomerization unit, any isomerization catalyst known in the art may be used. In some embodiments, suitable isomerization catalysts may contain molecular sieve and/or a metal from Group VII and/or a carrier. In an embodiment, the isomerization catalyst may contain SAPO-11 or SAPO41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

Other factors, such as the concentration of water or undesired oxygenated intermediates, may also effect the composition and yields of the $\geq C_4$ compounds, as well as the activity and stability of the condensation catalyst. In such cases, the process may include a dewatering step that removes a portion of the water prior to the condensation reaction and/or the optional dehydration reaction, or a separation unit for removal of the undesired oxygenated intermediates. For instance, a separator unit, such as a phase separator, extractor, purifier or distillation column, may be installed prior to the condensation reactor so as to remove a portion of the water from the reactant stream containing the oxygenated intermediates. A separation unit may also be installed to remove specific oxygenated intermediates to allow for the production of a desired product stream containing hydrocarbons within a particular carbon range, or for use as end products or in other systems or processes.

Thus, in one embodiment, the fuel blend produced by the processes described herein is a hydrocarbon mixture that meets the requirements for jet fuel (e.g., conforms with ASTM D1655). In another embodiment, the product of the processes described herein is a hydrocarbon mixture that comprises a fuel blend meeting the requirements for a diesel fuel (e.g., conforms with ASTM D975).

In another embodiment, a fuel blend comprising gasoline hydrocarbons (i.e., a gasoline fuel) may be produced. "Gasoline hydrocarbons" refer to hydrocarbons predominantly comprising $C_{5-9}$ hydrocarbons, for example, $C_{6-8}$ hydrocarbons, and having a boiling point range from 32° C. (90° F.) to about 204° C. (400° F.). Gasoline hydrocarbons may include, but are not limited to, straight run gasoline, naphtha, fluidized or thermally catalytically cracked gasoline, VB gasoline, and coker gasoline. Gasoline hydrocarbons content is determined by ASTM Method D2887.

In yet another embodiment, the $\geq C_2$ olefins may be produced by catalytically reacting the oxygenated intermediates in the presence of a dehydration catalyst at a dehydration temperature and dehydration pressure to produce a reaction stream comprising the $\geq C_2$ olefins. The $\geq C_2$ olefins may comprise straight or branched hydrocarbons containing one or more carbon-carbon double bonds. In general, the $\geq C_2$ olefins may contain from 2 to 8 carbon atoms, and more preferably from 3 to 5 carbon atoms. In one embodiment, the olefins may comprise propylene, butylene, pentylene, isomers of the foregoing, and mixtures of any two or more of the foregoing. In another embodiment, the $\geq C_2$ olefins may include $\geq C_4$ olefins produced by catalytically reacting a portion of the $\geq C_2$ olefins over an olefin isomerization catalyst.

The dehydration catalyst may comprise a member selected from the group consisting of an acidic alumina, aluminum phosphate, silica-alumina phosphate, amorphous silica-alumina, aluminosilicate, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. In one embodiment, the dehydration catalyst may further comprise a modifier selected from the group consisting of Ce, Y, Sc, La, Li, Na, K, Rb, Cs, Mg, Ca, Sr, Ba, P, B, Bi, and a combination of any two or more of the foregoing. In another embodiment, the dehydration catalyst may further comprise an oxide of an element, the element selected from the group consisting of Ti, Zr, V, Nb, Ta, Mo, Cr, W, Mn, Re, Al, Ga, In, Fe, Co, Ir, Ni, Si, Cu, Zn, Sn, Cd, P, and a combination of any two or more of the foregoing. In yet another embodiment, the dehydration catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In yet another embodiment, the dehydration catalyst may comprise an aluminosilicate zeolite. In some embodiments, the dehydration catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the dehydration catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the dehydration catalyst may comprise a bifunctional pentasil ring-containing aluminosilicate zeolite. In some embodiments, the dehydration catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the dehydration catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

The dehydration reaction may be conducted at a temperature and pressure where the thermodynamics are favorable. In general, the reaction may be performed in the vapor phase, liquid phase, or a combination of both. In one embodiment, the dehydration temperature may range between about 100° C. and about 500° C., and the dehydration pressure may range between about 1 bar (absolute) and about 60 bar. In another embodiment, the dehydration temperature may range between about 125° C. and about 450° C. In some embodiments, the dehydration temperature may range between about 150° C. and about 350° C., and the dehydration pressure may range between about 5 bar and about 50 bar. In yet another embodiment, the dehydration temperature may range between about 175° C. and about 325° C.

The $\geq C_6$ paraffins are produced by catalytically reacting $\geq C_2$ olefins with a stream of $\geq C_4$ isoparaffins in the presence of an alkylation catalyst at an alkylation temperature and alkylation pressure to produce a product stream comprising $\geq C_6$ paraffins. The $\geq C_4$ isoparaffins may include alkanes and cycloalkanes having 4 to 7 carbon atoms, such as isobutane, isopentane, naphthenes, and higher homologues having a tertiary carbon atom (e.g., 2-methylbutane and 2,4-dimethylpentane), isomers of the foregoing, and mixtures of any two or more of the foregoing. In one embodiment, the stream of $\geq C_4$ isoparaffins may comprise internally generated $\geq C_4$ isoparaffins, external $\geq C_4$ isoparaffins, recycled $\geq C_4$ isoparaffins, or combinations of any two or more of the foregoing.

The $\geq C_6$ paraffins may be branched paraffins, but may also include normal paraffins. In one version, the $\geq C_6$ paraffins may comprise a member selected from the group consisting of a branched $C_{6-10}$ alkane, a branched $C_6$ alkane, a branched $C_7$ alkane, a branched $C_8$ alkane, a branched $C_9$ alkane, a branched $C_{10}$ alkane, or a mixture of any two or more of the foregoing. In one version, the $\geq C_6$ paraffins may include, for example, dimethylbutane, 2,2-dimethylbutane, 2,3-dimethylbutane, methylpentane, 2-methylpentane, 3-methylpentane, dimethylpentane, 2,3-dimethylpentane, 2,4-dimethylpentane, methylhexane, 2,3-dimethylhexane, 2,3,4-trimethylpentane, 2,2,4-trimethylpentane, 2,2,3-trimethylpentane, 2,3,3-trimethylpentane, dimethylhexane, or mixtures of any two or more of the foregoing.

The alkylation catalyst may comprise a member selected from the group of sulfuric acid, hydrofluoric acid, aluminum chloride, boron trifluoride, solid phosphoric acid, chlorided alumina, acidic alumina, aluminum phosphate, silica-alumina phosphate, amorphous silica-alumina, aluminosilicate, aluminosilicate zeolite, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. The alkylation catalyst may also include a mixture of a mineral acid with a Friedel-Crafts metal halide, such as aluminum bromide, and other proton donors.

In one embodiment, the alkylation catalyst may comprise an aluminosilicate zeolite. In some embodiments, the alkylation catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the alkylation catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the alkylation catalyst may comprise a bifunctional pentasil ring-containing aluminosilicate zeolite. In some embodiments, the alkylation catalyst may further comprise a modifier selected from the group consisting of Ga, In, Zn, Fe, Mo, Ag, Au, Ni, P, Sc, Y, Ta, a lanthanide, and a combination of any two or more of the foregoing. In some embodiments, the alkylation catalyst may further comprise a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing. In one version, the dehydration catalyst and the alkylation catalyst may be atomically identical.

The alkylation reaction may be conducted at a temperature where the thermodynamics are favorable. In general, the alkylation temperature may range between about −20° C. and about 300° C., and the alkylation pressure may range between about 1 bar (absolute) and about 80 bar. In some embodiments, the alkylation temperature may range between about 100° C. and about 300° C. In another version, the alkylation temperature may range between about 0° C. and about 100° C. In yet other embodiments, the alkylation temperature may range between about 0° C. and about 50° C. In still other embodiments, the alkylation temperature may range between about 70° C. and about 250° C., and the alkylation pressure may range between about 5 bar and about 80 bar. In one embodiment, the alkylation catalyst may comprise a mineral acid or a strong acid. In another embodiment, the alkylation catalyst may comprise a zeolite and the alkylation temperature may be greater than about 100° C.

In an embodiment, an olefinic oligomerization reaction may conducted. The oligomerization reaction may be carried out in any suitable reactor configuration. Suitable configurations may include, but are not limited to, batch reactors, semi-batch reactors, or continuous reactor designs such as, for example, fluidized bed reactors with external regeneration vessels. Reactor designs may include, but are not limited to tubular reactors, fixed bed reactors, or any other reactor type suitable for carrying out the oligomerization reaction. In an embodiment, a continuous oligomerization process for the production of diesel and jet fuel boiling range hydrocarbons may be carried out using an oligomerization reactor for contacting an olefinic feed stream comprising short chain olefins having a chain length of from 2 to 8 carbon atoms with a zeolite catalyst under elevated temperature and pressure so as to convert the short chain olefins to a fuel blend in the diesel boiling range. The oligomerization reactor may be operated at relatively high pressures of about 20 bar to about 100 bar, and temperatures ranging between about 150° C. and about 300° C., preferably between about 200° C. to 250° C.

The resulting oligomerization stream results in a fuel blend that may have a wide variety of products including products comprising $C_5$ to $C_{24}$ hydrocarbons. Additional processing may be used to obtain a fuel blend meeting a desired standard. An initial separation step may be used to generate a fuel blend with a narrower range of carbon numbers. In an embodiment, a separation process such as a distillation process may be used to generate a fuel blend comprising $C_{12}$ to $C_{24}$ hydrocarbons for further processing. The remaining hydrocarbons may be used to produce a fuel blend for gasoline, recycled to the oligomerization reactor, or used in additional processes. For example, a kerosene fraction may be derived along with the diesel fraction and may either be used as an illuminating paraffin, as a jet fuel blending component in conventional crude or synthetic derived jet fuels, or as reactant (especially $C_{10}$ to $C_{13}$ fraction) in the process to produce LAB (Linear Alkyl Benzene). The naphtha fraction, after hydroprocessing, may be routed to a thermal cracker for the production of ethylene and propylene or routed to a catalytic cracker to produce ethylene, propylene, and gasoline.

Additional processes may be used to treat the fuel blend to remove certain components or further conform the fuel blend to a diesel or jet fuel standard. Suitable techniques may include hydrotreating to remove any remaining oxygen, sulfur, or nitrogen in the fuel blend. Hydrogenation may be carried after the hydrotreating process to saturate at least some olefinic bonds. Such hydrogenation may be performed to conform the fuel blend to a specific fuel standard (e.g., a diesel fuel standard or a jet fuel standard). The hydrogenation step of the fuel blend stream may be carried out according to the known procedures, in a continuous of batchwise manner.

To facilitate a better understanding of the present invention, the following examples of preferred embodiments are given. In no way should the following examples be read to limit, or to define, the scope of the invention.

EXAMPLES

Example 1

Effects of Solvent Impregnation and Factors Affecting Transfer of Various Types of Cellulosic Biomass Example 1A 1.5 grams of mixed softwood chips (14% moisture), sized to nominal 8-mm×4-mm×3-mm chips, were dropped into a 2.5 cm layer of mixed organic/aqueous solvent (25% 2-propanol and 20% ethanol in deionized water) in an 8 dram vial of 21 mm diameter. Approximately 50% of the chips dropped to the bottom of the vial, while the remaining 50% floated at the surface despite mixing to disrupt surface tension. When water was substituted for the mixed organic/aqueous solvent, similar results were obtained. Example 1B: Example 1A was repeated, except 3.5 grams of softwood chips were added to the 8-dram vial, and solvent was added thereafter to obtain a 2.6 cm layer of mixed organic/aqueous solvent in the vial. The contents were mixed and allowed to settle. Approximately 60% of the wood chips remained at the bottom of the vial, and approximately 40% floated to the top surface. Example 1C: Example 1B was repeated, except 2.0 grams of similarly sized pine chips (34.3% moisture) were used. Approximately 75% of the chips remained on the bottom of the vial, and approximately 25% floated on the surface. Example 1D: 6.55 grams of softwood chips having the dimensions of Example 1A were loaded to a 1-inch diameter pressure vessel 90% filled with 33 grams of a mixed organic/aqueous solvent (25% 2-propanol and 20% ethanol in deionized water). The vessel was pressurized to 50 psi with $N_2$ for 30 minutes and then to 200 psi with $N_2$ for 30 minutes. The pressure was then vented, and the contents were displaced to a beaker. The solvent was then decanted to recover the solvent-impregnated wood chips. 2.18 grams of the solvent-impregnated wood chips were then added to fresh mixed aqueous/organic solvent as in Example 1A. All of the wood chips immediately sank to the bottom of the vial. Example 1E: A 1-inch diameter tube was filled a 2.5 inches of the nominal 8 mm×6 mm×3 mm softwood chips. This provides a nominal tube-to-particle aspect ratio of about 3:1. Opening of a bottom 1-inch ball valve provided no dropping of wood chips out of the vertical retention tube. Pressurizing the tube with 50 psi $N_2$ and then 200 psi $N_2$ resulted in the release of gas pressure when the ball valve was opened, but no chips were dislodged from the tube. Addition of 30.4 grams of a mixed organic/aqueous solvent (25% 2-propanol and 20% ethanol in deionized water) resulted in a swelling of the chip layer from 2.5 to 2.87 inches. Opening of the ball valve displaced 27 grams of liquid from the bed, but only 5 wood chips were displaced. Application of a mechanical vibrator to the tube enabled complete dislodging of all the contained chips, despite being wetted with the solvent. Example 1F: Example 1E was repeated with a nominal 101-mm diameter glass tube and wood chips (14% moisture) having a nominal 9.5 mm maximum length. This gives a nominal tube-to-particle aspect ratio of greater than 9.5. All chips immediately fell from the tube upon release of a bottom slider valve. Similar results were obtained when the chips were not wetted with the mixed organic/aqueous solvent.

The foregoing results demonstrate the beneficial effects of pressurized solvent impregnation on the wood chips. In the absence of pressurized solvent impregnation, a substantial fraction of the wood chips will float on the solvent when charged to a digestion unit. At a tube-to-particle aspect ratio of 3:1, bridging between the wood chips impeded their transfer. At an aspect ratio of 9.5:1, bridging was prevented, and either solvent-impregnated or unwetted wood chips could be transferred. Where bridging impeded transfer of the wood chips, mechanical vibration could be used to facilitate the transfer of solvent-impregnated wood chips.

Example 2

Catalytic Reduction of Sorbitol

Catalytic reduction of 20 grams of 50 wt. % sorbitol solution was examined in a 75-milliliter Parr5000 reactor operated at 240° C. under 75 bar of $H_2$ pressure, in the presence of 0.35 grams of 1.9% Pt/zirconia catalyst modified with rhenium at Re:Pt ratio of 3.75:1. The reaction was continued for 18 hours, before sampling the reaction mixture via a gas chromatographic mass spectrometry (GC-MS) method using a 60 mm×0.32 mm ID DB-5 column of 1 m thickness, with 50:1 split ratio, 2 ml/min helium flow, and column oven held at 40° C. for 8 minutes, followed by a ramp to 285° C. at 10° C./min., and a hold time of 53.5 minutes. The GC-MS results indicated greater than 90% conversion of sorbitol to monooxygenates and organic acid byproducts, as evidenced by a drop from neutral pH to 2.7. The reaction product comprised 20.3% ethanol by weight, 25.4% 1-propanol and 2-propanol by weight, and 2.5% dimethylketone (acetone) by weight. The presence of acetic acid was confirmed via an HPLC method using a Bio-Rad Aminex HPX-87H column (300 mm×7.8 mm) operated at 0.6 ml/min. of a 5 mM sulfuric acid in water mobile phase, at an oven temperature of 30° C., a run time of 70 minutes, and both RI and UV (320 nm) detectors.

Example 3

Digestion in Place in a Pressurization Vessel

Example 3A pressure vessel was constructed from ½-inch diameter by 1-foot long 316 stainless steel tubing and heated via an electric band heater (Gaumer Company, Inc.). The pressure vessel was packed with 4.19 grams of nominal ⅛-inch by ¼-inch by 3-mm pine wood mini-chips (moisture content=14% as determined by overnight drying in a vacuum oven at 85° C.). A solvent mixture comprising 20 wt. % 2-propanol, 25 wt. % ethanol, 2 wt. % dimethylketone, and 2 wt. % acetic acid in deionized water was prepared to mimic the reaction mixture obtained in Example 2. The mixed organic/aqueous solvent had a pH of about 2.7. The solvent mixture was fed to a digestion unit via an HPLC pump (Eldex).

The pressure vessel and a receiving vessel were pressured to 70 bar via charging with a liquid solvent feed followed by the addition of hydrogen from a 90 bar supply source. The vessel and contents were heated to 180° C. before establishing a simulated digestion solvent feed flow of 0.20 ml/min. Contact with the solvent was continued for 16.9 hours at an average weight hourly space velocity of 3.35 grams of feed per gram of dry wood per hour (g/g-wood/hour). Hydrolysate product from digestion was collected in a surge vessel also pre-pressurized to 70 bar via addition of $H_2$. Backpressure control on the pressure vessel and surge vessel enabled pressure to be maintained at 70 bar throughout the test procedure. Analysis of undigested wood at the end of the run indicated 39.6% dissolution and digestion of the original wood charge.

Example 3B

Example 3A was repeated at a pressure vessel digestion temperature of 200° C., with a weight hourly space velocity for solvent feed of 1.02 g/g-wood/hour, and a digestion contact time of 6 hours. Analysis of undigested wood indicated only 29.1% digestion of the original wood charge.

Example 3C

Example 3A was repeated at a temperature of 240° C., with a weight hourly space velocity of 1.79 g/g-wood/hour, and a digestion contact time of 5.6 hours. 1N KOH was added to buffer the solvent feed to a pH of 5.4. No wood solids were observed at the end of the digestion. This result indicates that that 100% dissolution and digestion is possible at a temperature of 240° C., despite buffering to a more neutral pH value relative to the more acidic feed solvent used for Examples 3A and 3B and a reduction in the digestion time to less than 6 hours.

Example 3D

Example 3A was repeated at a temperature of 210° C., with a weight hourly space velocity of 1.27 g/g-wood/hour, and a digestion contact time of 7.1 hours. Despite the increase in contact time relative to example 3C, only 65% of the wood charge was digested.

Example 3E

Example 3A was repeated at a temperature of 190° C., with a weight hourly space velocity of 1.66 g/g-wood/hour, for a contact time of 6.8 hours. Only 19% of the wood charge was digested, despite the increase in flow rate relative to Example 3D.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
  providing a biomass conversion system comprising a pressurization zone and a digestion unit that are operatively connected to one another;
  providing a cellulosic biomass at a first pressure;
  introducing at least a portion of the cellulosic biomass into the pressurization zone and then pressurizing the pressurization zone to a second pressure that is higher than the first pressure;
  after pressurizing the pressurization zone, transferring at least a portion of the cellulosic biomass from the pressurization zone to the digestion unit, which is at a third pressure that is less than or equal to the second pressure but higher than the first pressure; and digesting at least a portion of the cellulosic biomass in the digestion unit to produce a hydrolysate comprising soluble carbohydrates within a liquor phase.

2. The method of claim 1, wherein providing a cellulosic biomass and introducing at least a portion of the cellulosic biomass take place at the same time.

3. The method of claim 1, wherein introducing at least a portion of the cellulosic biomass into the pressurization zone comprises a technique or apparatus selected from the group consisting of a screw feeder, a conveyer, a bin dispenser, manual addition, and any combination thereof.

4. The method of claim 1, wherein, after transferring at least a portion of the cellulosic biomass, the digestion unit is at a pressure of at least about 30 bar.

5. The method of claim 1, further comprising:
converting the hydrolysate into a biofuel.

6. The method of claim 1, wherein at least about 60% of the cellulosic biomass, on a dry basis, is digested to produce hydrolysate.

7. The method of claim 1, wherein at least about 90% of the cellulosic biomass, on a dry basis, is digested to produce hydrolysate.

8. The method of claim 1, further comprising:
before transferring at least a portion of the cellulosic biomass, reducing the pressure in the digestion unit to a fourth pressure that is at least about 75% of the third pressure.

9. The method of claim 1, wherein the third pressure ranges between about 30 bar and about 430 bar.

10. The method of claim 1, wherein the third pressure ranges between about 50 bar and about 330 bar.

11. The method of claim 1, wherein the third pressure ranges between about 70 bar and about 130 bar.

12. The method of claim 1, wherein pressurizing takes place, at least in part, by introducing at least a portion of the liquor phase into the pressurization zone.

13. The method of claim 12, wherein the liquor phase comprises an organic solvent.

14. The method of claim 12, wherein pressurizing takes place, at least in part, by introducing a gas into the pressurization zone.

15. The method of claim 1, wherein the cellulosic biomass comprises wood.

16. A method comprising:
providing a biomass conversion system comprising a pressurization zone and a digestion unit that are operatively connected to one another;
providing a cellulosic biomass;
introducing at least a portion of the cellulosic biomass into the pressurization zone and then pressurizing the pressurization zone, at least in part, with a liquor phase comprising an organic solvent;
after pressurizing the pressurization zone, transferring at least a portion of the cellulosic biomass from the pressurization zone to the digestion unit, wherein the digestion unit is at a pressure that is less than or equal to the pressure of the pressurization zone; and
digesting at least about 90% of the cellulosic biomass, on a dry basis, to produce a hydrolysate comprising soluble carbohydrates within a liquor phase.

17. The method of claim 16, wherein introducing at least a portion of the cellulosic biomass into the pressurization zone comprises a technique or apparatus selected from the group consisting of a screw feeder, a conveyer, a bin dispenser, manual addition, and any combination thereof.

18. The method of claim 16, wherein pressurizing takes place, at least in part, by introducing a gas into the pressurization zone.

19. The method of claim 16, further comprising:
converting the hydrolysate into a biofuel.

20. The method of claim 16, wherein, after transferring at least a portion of the cellulosic biomass, the digestion unit is at a pressure of at least about 30 bar.

21. The method of claim 16, wherein the pressure of the digestion unit ranges between about 30 bar and about 130 bar.

22. The method of claim 16, wherein the pressure of the digestion unit ranges between about 50 bar and about 330 bar.

23. The method of claim 16, wherein the pressure of the digestion unit ranges between about 70 bar and about 130 bar.

24. The method of claim 16, further comprising:
recirculating at least a portion of a reaction product produced from the hydrolysate back into the digestion unit.

* * * * *